US012265354B2

(12) United States Patent
Funatani et al.

(10) Patent No.: US 12,265,354 B2
(45) Date of Patent: Apr. 1, 2025

(54) IMAGE FORMING APPARATUS

(71) Applicant: CANON KABUSHIKI KAISHA, Tokyo (JP)

(72) Inventors: Kazuhiro Funatani, Kanagawa (JP); Shinsuke Kobayashi, Kanagawa (JP); Kensuke Umeda, Kanagawa (JP); Takanori Watanabe, Kanagawa (JP); Ai Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/343,901

(22) Filed: Jun. 29, 2023

(65) Prior Publication Data

US 2023/0341807 A1 Oct. 26, 2023

Related U.S. Application Data

(63) Continuation of application No. 17/845,073, filed on Jun. 21, 2022, now Pat. No. 11,720,046, which is a (Continued)

(30) Foreign Application Priority Data

Jun. 2, 2020 (JP) ................................ 2020-096395

(51) Int. Cl.

*G03G 21/00* (2006.01)
*G03G 15/01* (2006.01)

(Continued)

(52) U.S. Cl.

CPC ..... *G03G 21/0064* (2013.01); *G03G 15/0131* (2013.01); *G03G 15/0233* (2013.01);

(Continued)

(58) Field of Classification Search

None

See application file for complete search history.

(56) References Cited

U.S. PATENT DOCUMENTS 5,563,691 A 10/1996 Hayakawa et al.
5,765,286 A 6/1998 Sato et al.

(Continued)

FOREIGN PATENT DOCUMENTS

JP H08-022232 A 1/1996
JP H09-211979 A 8/1997

(Continued)

OTHER PUBLICATIONS

Office Action dated Mar. 19, 2024, in Japanese Patent Application No. 2020-096395.

*Primary Examiner* — Walter L Lindsay, Jr.
*Assistant Examiner* — Andrew V Do
(74) *Attorney, Agent, or Firm* — Venable LLP

(57) ABSTRACT

Provided are an image bearing member; a charging member that charges the image bearing member; an exposure unit that exposes the image bearing member; a developing unit that develops an electrostatic latent image as a developer image by supplying a developer, charged to regular polarity, to the image bearing member; a transfer member that transfers the developer image to a transfer-receiving body; and a collecting member that collects a deposit on the image bearing member downstream of a transfer portion of the image bearing member at which the developer image is transferred to the transfer-receiving body by the transfer member, and upstream of a charging portion of the image bearing member charged by the charging member, in a rotation direction of the image bearing member. After transfer of the developer image to the transfer-receiving body, the (Continued)

developer remaining on the image bearing member is collected by the developing unit.

9 Claims, 8 Drawing Sheets

Related U.S. Application Data continuation of application No. 17/335,158, filed on Jun. 1, 2021, now Pat. No. 11,397,400.

(51) Int. Cl.
*G03G 15/02* (2006.01)
*G03G 15/08* (2006.01)
*G03G 21/10* (2006.01)

(52) U.S. Cl.
CPC ......... *G03G 15/0808* (2013.01); *G03G 21/10* (2013.01); *G03G 2215/022* (2013.01)

(56) References Cited

U.S. PATENT DOCUMENTS

| | | | |
|---|---|---|---|
| 6,266,502 | B1 | 7/2001 | Matsuzaki et al. |
| 8,750,749 | B2 | 6/2014 | Suzuki et al. |
| 9,086,671 | B2 | 7/2015 | Ichinose et al. |
| 9,341,988 | B2 | 5/2016 | Funatani et al. |
| 9,599,935 | B2 | 3/2017 | Asai et al. |
| 9,971,298 | B2 | 5/2018 | Matsukawa et al. |
| 10,209,668 | B2 | 2/2019 | Matsukawa et al. |
| 11,397,400 | B2 | 7/2022 | Funatani et al. |
| 2004/0120729 | A1 | 6/2004 | Uyama et al. |

FOREIGN PATENT DOCUMENTS

| | | | |
|---|---|---|---|
| JP | H09-269710 | A | 10/1997 |
| JP | 2000-122500 | A | 4/2000 |
| JP | 2004-117670 | A | 4/2004 |
| JP | 2006-350063 | A | 12/2006 |
| JP | 2007-031145 | A | 2/2007 |
| JP | 2017-156450 | A | 9/2017 |

IMAGE FORMING APPARATUS

This is a continuation of U.S. patent application Ser. No. 17/845,073, filed Jun. 21, 2022, which is a continuation of U.S. patent application Ser. No. 17/335,158, filed Jun. 1, 2021, now U.S. Pat. No. 11,397,400.

BACKGROUND OF THE INVENTION

Field of the Invention

The present invention relates to an image forming apparatus, such as a laser printer, a copier or fax machine, in which a recorded image is obtained through transfer of a toner image, which is formed on an image bearing member, to a transfer material by using for instance an electrophotographic system.

Description of the Related Art

In a cleaner-less scheme in which a developer, which remains on a photosensitive drum without being transferred to paper, is collected in a developing portion to be reused, a problem may occur in that paper dust and/or a filler adhered to the photosensitive drum are also collected in a developing device, and this problematically affects the charging performance of the developer. Therefore, a configuration (Japanese Patent Application Publication No. 2017-156450) for collecting paper dust/filler adhered to the photosensitive drum has been proposed.

SUMMARY OF THE INVENTION

However, there are various types of paper dust and fillers in paper, and in terms of charging characteristics thereof, some are readily charged positively and some are readily charged negatively.

In a case in particular where toner and paper dust that is readily charged to a polarity different from that of the toner are mixed with each other within a developing device, the toner may become charged more than anticipated on account of triboelectric charging, and various image defects may occur that include transfer defects derived from electric field insufficiency.

It is an object of the present invention, arrived at in the light of the above considerations, to provide an image forming apparatus that allows suppressing image defects by being provided with a collecting member capable of collecting paper dust/filler having opposite polarity to that of toner adhered to the photosensitive drum, while curtailing increases in cost and equipment size.

In order to attain that object, an image forming apparatus of the present invention includes:

an image bearing member;

a charging member that charges the image bearing member;

an exposure unit that exposes the image bearing member so as to form an electrostatic latent image on the image bearing member;

a developing unit that develops the electrostatic latent image as a developer image by supplying a developer, charged to regular polarity, to the image bearing member;

a transfer member that transfers the developer image from the image bearing member to a transfer-receiving body; and a collecting member that collects a deposit on the image bearing member downstream of a transfer portion of the image bearing member at which the developer image is transferred to the transfer-receiving body by the transfer member, and upstream of a charging portion of the image bearing member charged by the charging member, in a rotation direction of the image bearing member;

wherein the developer remaining on the image bearing member without having been transferred to the transfer-receiving body is collected by the developing unit, and wherein the collecting member has charging characteristics of being charged to a charging polarity same as the regular polarity, when triboelectrically charged through contact with the image bearing member.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Figure 1:
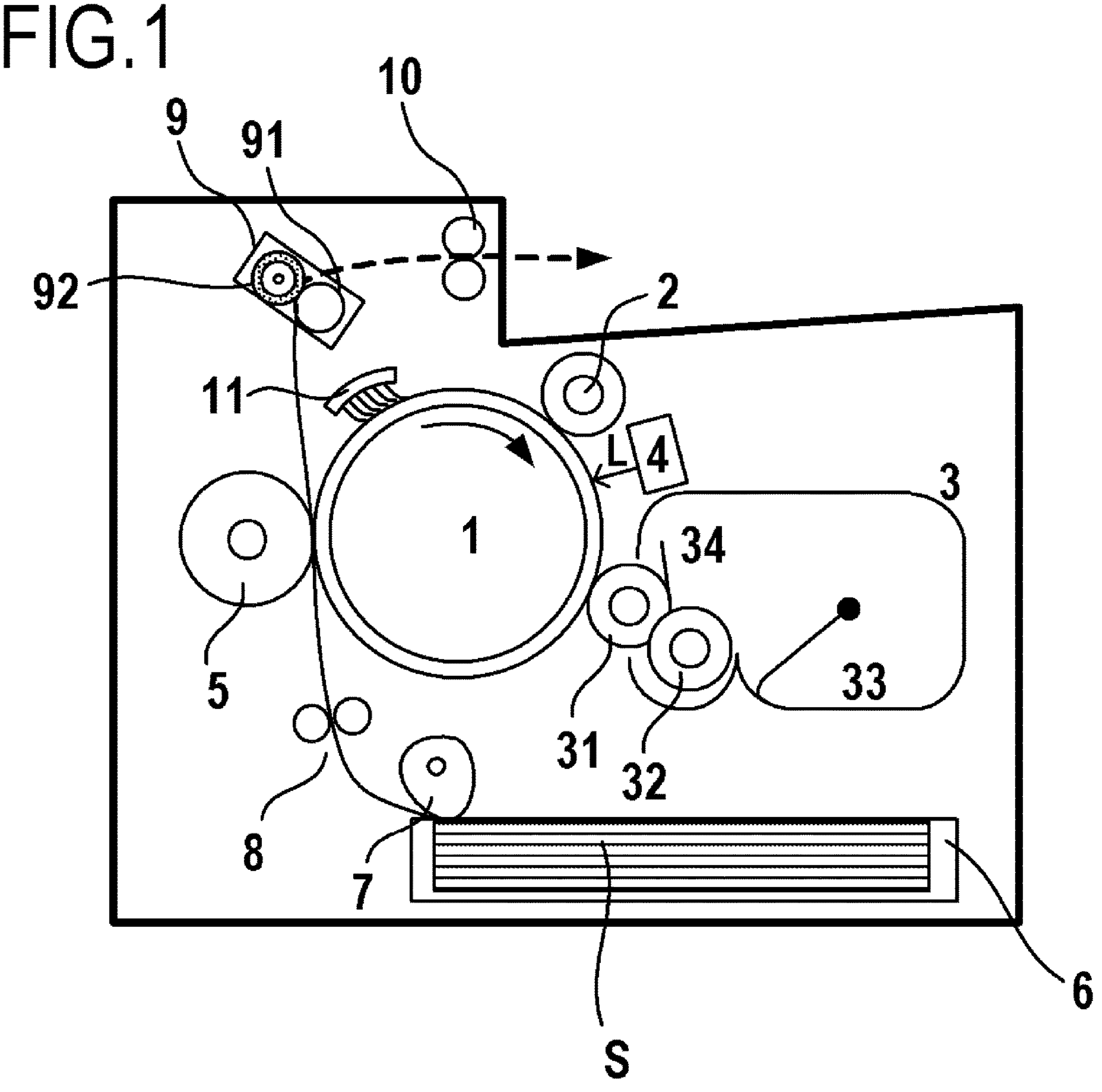
FIG. 1 is a schematic diagram of an image forming apparatus in Embodiment 1.

FIG. 1 illustrates the schematic configuration of an embodiment of the image forming apparatus according to the present invention. The image forming apparatus of the present embodiment is a monochrome printer.

A cylindrical photosensitive member as an image bearing member, i.e. a photosensitive drum 1, is provided on the image forming apparatus of the present embodiment. A charging roller 2 as a charging member and a developing apparatus 3 as a developing unit are provided around the photosensitive drum 1. An exposure device 4 as an exposure unit is provided, at the bottom of the figure, between the charging roller 2 and the developing apparatus 3. The transfer roller 5 is in pressure-contact with the photosensitive drum 1.

The photosensitive drum 1 of the present embodiment is a negatively chargeable organic photosensitive member. The photosensitive drum 1 has a photosensitive layer on a drum-like substrate of aluminum, and is rotationally driven, at a predetermined process speed, in the direction of the arrow in the figure (clockwise direction), by a driving device (not shown). In the present embodiment the process speed corresponds to the peripheral speed of the photosensitive drum 1 (surface movement speed).

The charging roller 2 comes into contact with the photosensitive drum 1 at a predetermined pressure-contact force, to form a charging portion. A desired charging voltage is applied by a charging high-voltage power source (not shown), as a charging voltage supply unit, to uniformly charge the surface of the photosensitive drum 1 to a predetermined potential. In the present embodiment, the photosensitive drum 1 is negatively charged by the charging roller 2.

In the present embodiment, the exposure device 4 is a laser scanner apparatus that outputs laser light corresponding to image information inputted from an external device such as a host computer, and that scans and exposes the surface of the photosensitive drum 1. An electrostatic latent image (electrostatic image) corresponding to the image information becomes formed, as a result of this exposure, on the surface of the photosensitive drum 1. The exposure device 4 is not limited to being a laser scanner device, and for instance an LED array in which multiple LEDs are arrayed along the longitudinal direction of the photosensitive drum 1 may be used as the exposure device 4.

In the present embodiment, a contact developing scheme is resorted to as the developing scheme. The developing apparatus 3 is made up of a developing roller 31 as a developer carrier, a toner supply roller 32 as a developer supply member, a developer accommodating chamber 33 that accommodates a toner, and a developing blade 34. The toner supplied to the developing roller 31 from the developer accommodating chamber 33 by the toner supply roller 32 passes through a contact portion with the developing blade 34, and becomes charged as a result to a predetermined polarity. In the present embodiment, there is used a toner having a particle diameter of 6 μm and having negative polarity as the normal charging polarity. In the present embodiment, a single-component non-magnetic contact developing method is resorted to, but a two-component non-magnetic contact/contactless developing method, or a magnetic developing method, may be used instead.

The electrostatic latent image formed on the photosensitive drum 1 is developed as a toner image (developer image) by toner (developer) that is conveyed by the developing roller 31, at a portion where the developing roller 31 and the photosensitive drum 1 oppose each other. Developing voltage is applied to the developing roller 31 by a developing high-voltage power supply (not shown), as a developing voltage application unit. In the present embodiment, the electrostatic latent image is developed in accordance with a reverse developing scheme. In the photosensitive drum 1 after a charging treatment, specifically, toner charged to the same polarity as the charging polarity of the photosensitive drum 1 adheres to the portion where charge has decayed on account of exposure, and the electrostatic latent image becomes developed as a result in the form of a toner image.

A transfer roller configured out of an elastic member such as sponge rubber or the like made up of polyurethane rubber, ethylene-propylene-diene rubber (EPDM) or nitrile butadiene rubber (NBR) can be appropriately used as the transfer roller 5.

The transfer roller 5 is pressed against the photosensitive drum 1, to form a transfer portion of pressure-contact between the photosensitive drum 1 and the transfer roller 5. A transfer high-voltage power supply, not shown, as a transfer voltage application unit is connected to the transfer roller 5, such that a predetermined voltage is applied to the transfer roller 5 at predetermined timings.

A transfer material S as a transfer-receiving body stored in a cassette 6 is fed by a paper feeding unit 7, according to the timing at which the toner image formed on the photosensitive drum 1 reaches the transfer portion, and passes a resist roller pair 8, to be conveyed to the transfer portion. The toner image formed on the photosensitive drum 1 is transferred onto the transfer material S by the transfer roller 5 to which a predetermined transfer voltage has been applied by the transfer high-voltage power supply.

The transfer material S after toner image transfer is conveyed to a fixing unit 9. The fixing unit 9 is a fixing unit of film heating type provided with a fixing heater not shown, a fixing film 91 having built therein a thermistor, not shown, that measures the temperature of the fixing heater, and a pressure roller 92 for pressure-contact against the fixing film 91. The toner image is fixed through heating and pressing of the transfer material S, and passes then a paper ejection roller pair 10, to be discharged out of the machine.

In addition, untransferred toner that remains on the photosensitive drum 1 without having been transferred to the transfer material S is removed according to the process below.

Untransferred toner includes toner that is positively charged, and toner that is negatively charged but does not have sufficient charge. The untransferred toner is charged to negative polarity once more, by electrical discharge, in the charging portion. The untransferred toner having been charged to negative polarity once more at the charging portion reaches then a developing portion accompanying the rotation of the photosensitive drum 1. An electrostatic latent image becomes formed on the photosensitive drum 1 that has reached the developing portion, as described above. The behavior of the untransferred toner having reached the developing portion will be separately explained for an exposure portion and for a non-image formation portion on the photosensitive drum 1.

The untransferred toner adhered to the non-image formation portion of the photosensitive drum 1 migrates to the developing roller 31 on account of a potential difference between the potential of the non-image formation portion and the developing voltage on the photosensitive drum 1, at the developing portion, and is collected in the developer accommodating chamber 33. The toner collected in the developer accommodating chamber 33 is used again for image formation.

Untransferred toner adhered to the exposure portion of the photosensitive drum 1 does not migrate from the photosensitive drum 1 to the developing roller 31 at the developing portion, but moves instead onto the transfer portion together with developed toner from the developing roller 31, is transferred to the transfer material S, and is removed from the photosensitive drum 1.

Paper Dust Removal Mechanism

A paper dust removal mechanism of the present embodiment will be explained next. As illustrated in FIG. 1, the image forming apparatus of the present embodiment has a brush member 11 (collecting member) as a paper dust removal mechanism. Although explained in further detail below, the brush member 11 is made up of polytetrafluoroethylene (PTFE) yarn 11*a* in the form of a plurality of bristles that rub the surface of the photosensitive drum 1, and a base fabric 11*b* that supports the PTFE yarn 11*a*. The brush member 11 is disposed so as to be in contact with the photosensitive drum 1 downstream of the transfer portion i.e. upstream of the charging portion, in the movement direction (rotation direction) of the photosensitive drum 1. The brush member 11 is supported by a support member, not shown, and is disposed at a position of fixing to the photosensitive drum 1, so as to rub the surface of the photosensitive drum 1 accompanying the movement thereof.

The brush member 11 captures (collects) deposits such as paper dust having migrated to the transfer portion on the photosensitive drum 1 from the recording material S, to reduce the amount of paper dust that moves to the charging portion and the developing portion downstream of the brush member 11 in the movement direction of the photosensitive drum 1.

A base fabric with PTFE yarn woven thereinto is used in the brush member 11 of the present embodiment; the brush member 11 has charging characteristics whereby the brush member 11 is readily charged to negative polarity, which is identical to that of the toner, through triboelectric charging with the photosensitive drum 1. This effect will be explained below.

In the present embodiment, the length of the brush member 11 in the circumferential direction of the photosensitive drum 1 (hereafter lateral direction) is set to 5 mm, but is not limited thereto. For instance, the above length may be modified as appropriate in accordance with the image forming apparatus and the life of a process cartridge. Needless to say, the longer the brush member 11 is in the lateral direction, the longer is the period of time over which paper dust can be captured.

In the present embodiment, the length of the brush member 11 in the longitudinal direction is set to 216 mm, but is not limited thereto. For instance, the above length may be modified as appropriate in accordance with the maximum paper width.

The fineness of the brush member 11 in the present embodiment is 84T/48F (denoting a bundle of 48 yarns having a thickness of 84 g per 10000 m), but may be modified as appropriate, provided that the below-described brush density conditions can be satisfied.

Preferably, the density of the brush member 11 is determined taking into consideration the passage ability of toner and capturability of paper dust. Specifically, when the density of the brush member 11 is excessively high, the passage ability of toner worsens and toner becomes stacked, which may give rise to problems in that for instance the stacked toner scatters and contaminates the interior of the machine. When the density of the brush member 11 is excessively low the ability to capture paper dust is impaired.

A method for determining paper dust capturability will be explained next. In the present embodiment, paper dust capturability is determined on the basis of the number of spot images generated as a result of adhesion of paper dust to the photosensitive drum 1. When paper dust adheres to the photosensitive drum 1, charging of a paper dust adhesion portion is hindered in the charging portion, and the surface potential of the photosensitive drum 1 becomes lower than that at the surrounding non-paper dust adhesion portion. As a result, toner is prone to fly off the developing roller 31 to the paper dust adhesion portion, also in the non-image formation portion, giving rise to a spotted image.

In the present embodiment, a white image is printed using CenturyStar paper (by CENTURY PULP AND PAPER, product name) as the transfer material S, and spot images appearing on the tenth paper sheet are counted. In the present embodiment, the paper dust capturability is deemed to be poor (NG) in a case where there are 15 or more spots having a size of 0.8 mm or larger, which have a significant visual impact.

TABLE 1

| | Paper dust capturability | | Machine |
|---|---|---|---|
| Density of brush member 11 [kF/inch$^2$] | Number of spots (≥0.8 mm) | Determination | contamination |
| 40 | 28 | NG | No |
| 80 | 19 | NG | No |
| 110 | 10 | OK | No |
| 140 | 7 | OK | No |
| 170 | 5 | OK | No |
| 200 | 3 | OK | No |
| 230 | 1 | OK | Yes |
| 260 | 0 | OK | Yes |
| 290 | 1 | OK | Yes |

On the basis of the above results the density of the brush member 11 in the present embodiment was set to 170 kF/inch$^2$, which allows combining paper dust capturability with prevention of machine contamination (kF/inch$^2$ are the units of brush density, denoting number of filaments per square inch). On the basis of the above results it is considered that a density of the brush member 11 in the range of 110 kF/inch$^2$ to 200 kF/inch$^2$ is suitable herein.

Figure 2A:
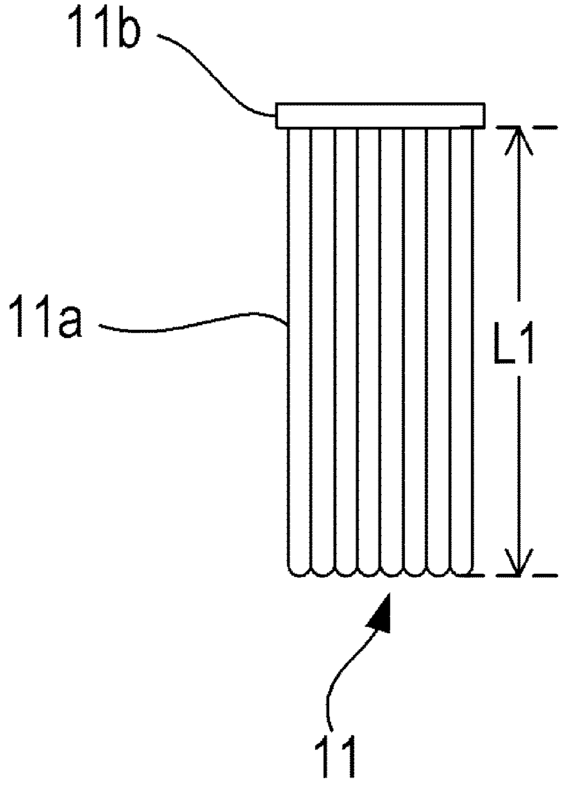
FIGS. 2A and 2B are schematic diagrams of a brush member in Embodiment 1.
Figure 2B:
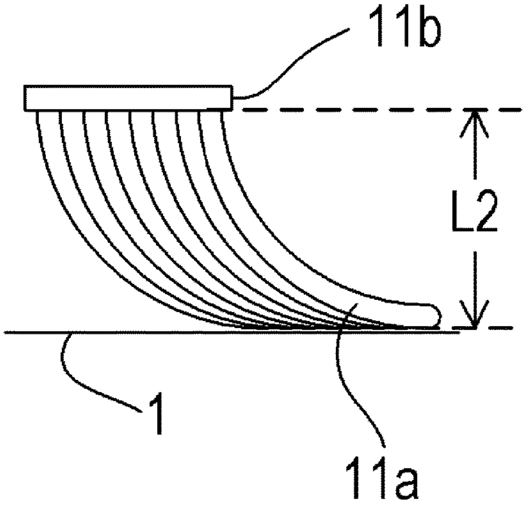

A penetration level of brush member 11 into the photosensitive drum 1 (hereinafter referred to as "penetration level of the brush member 11") will be explained now with reference to FIGS. 2A and 2B. FIG. 2A is a schematic diagram illustrating the state of a stand-alone brush member 11, and FIG. 2B is a schematic diagram of the state of the brush member 11 when brought into contact with the photosensitive drum 1 (state where the brush member 11 is built into the image forming apparatus).

As illustrated in FIG. 2A, the distance up to the tip of the PTFE yarn 11*a* exposed from the base fabric when the brush member 11 is in a stand-alone state, i.e. in the absence of an external force acting so as to bend the PTFE yarn 11*a*, is labeled as distance L1. The value of L1 in the present embodiment is 6.5 mm.

The base fabric 11*b* of the brush member 11 is fixed to a support member, not shown, installed at a predetermined installation position by a fixing member such as a double-sided tape; the brush member 11 being disposed so that the tip of the PTFE yarn 11*a* penetrates the space of the photosensitive drum 1. The clearance between the support member and the photosensitive drum 1 is fixed. Here L2 denotes the shortest distance from the base fabric 11*b* up to the photosensitive drum 1 in this case. In the present embodiment, the difference between the shortest distance L2 and L1 is defined as the penetration level of the brush member 11.

A method for determining the penetration level of the brush member 11 will be explained next. Studies by the inventors have revealed that the penetration level of the brush member 11 exerts a significant influence for instance on the paper dust capturability of the brush member 11. The term paper dust capturability denotes herein capturability of large-sized paper dust, for instance of a size of 0.8 mm or larger. The contact length between the brush member 11 and the photosensitive drum 1 is small in a case where the penetration level of the brush member 11 is small. As a result, the bristle tips of the brush member 11 move on account of the inertial force of large-sized paper dust that moves over the photosensitive drum 1, and the large-sized paper dust slips readily through. When large-sized paper dust slips through, problems may occur in that paper dust collected at the developing portion may be caught between the developing blade 34 and the developing roller 31, or the toner on the developing roller 31 may peel off, or streaks (hereafter referred to as development streaks) may appear in the image.

In a case where the penetration level of the brush member 11 is significant, the bristle tips of the brush member 11 lie against the photosensitive drum 1 (FIG. 2B), and the contact length between the brush member 11 and the photosensitive drum 1 increases. When the contact length between the brush member 11 and the photosensitive drum 1 is large, the bristle tips of the brush member 11 do not move readily when the paper dust and the brush member 11 come into contact with each other, and large-sized paper dust does not readily slip through, so that capturing performance of paper dust increases accordingly. The occurrence of development streaks can be suppressed as a result. In order to secure the capturability of large-sized paper dust, it is preferable to set the penetration level of the brush member 11 to be sufficiently large.

It was also found that the penetration level of the brush member 11 exerts a significant influence on the image. That is, the greater the penetration level of the brush member 11 is, the stronger becomes the contact pressure during rubbing against the photosensitive drum 1, and unintentional uneven charging may occur in the photosensitive drum 1, which manifests itself in the form of image density non-uniformity in the image (this is referred to hereafter as rubbing memory).

Table 2 sets out a relationship between the penetration level of the brush member 11 of the present embodiment, large-sized paper dust capturability, and occurrence of rubbing memory.

Figure 3:
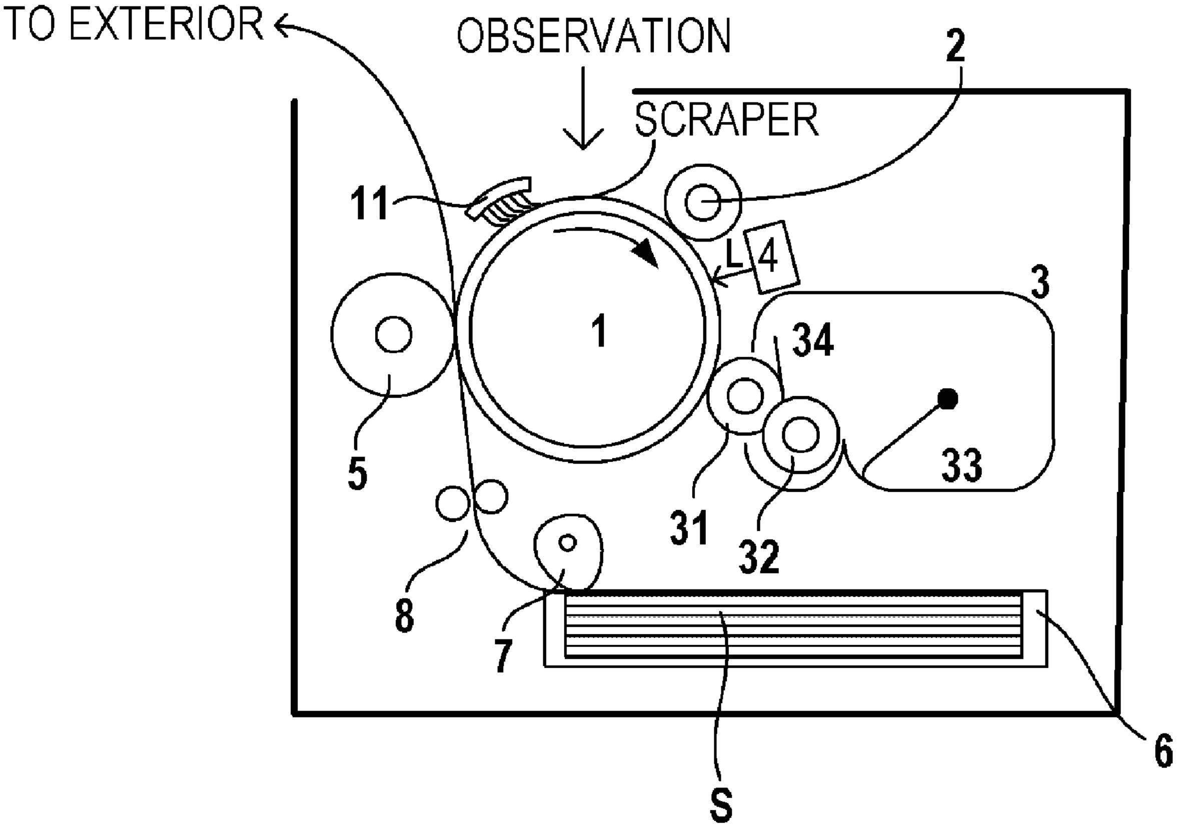
FIG. 3 is a schematic diagram of an experimental device of paper dust capturability in Embodiment 1.

A method for determining large-sized paper dust capturability will be explained next with reference to FIG. 3. In the present embodiment, an experimental device is constructed in which a scraper is attached to the downstream portion of the brush member 11 on the photosensitive drum 1, the paper dust collected by the scraper is observed, and large-sized paper dust capturability is determined on the basis of the number of large-sized paper dust particles contained in the collected paper dust. In the present embodiment, there is observed paper dust collected on the scraper after printing of 10 white images using Office 70 (by Canon Inc., product name), which is paper as the transfer material S; herein large-sized paper dust capturability is deemed to be poor (NG) if there are 15 or more paper dust particles having a size of 0.8 mm or larger.

TABLE 2

| Penetration level of brush member 11 | Paper dust capturability (0.8 mm or larger) Count | Determination | Density non-uniformity (rubbing memory) |
|---|---|---|---|
| 0.25 mm | 28 | NG | No |
| 0.50 mm | 19 | NG | No |
| 0.75 mm | 10 | OK | No |
| 1.00 mm | 7 | OK | No |
| 1.25 mm | 5 | OK | No |
| 1.50 mm | 3 | OK | Yes |
| 1.75 mm | 1 | OK | Yes |
| 2.00 mm | 0 | OK | Yes |
| 2.25 mm | 1 | OK | Yes |
| 2.50 mm | 0 | OK | Yes |

On the basis of the above results the penetration level of the brush member 11 in the present embodiment is set to 1.00 mm, which allows combining large-sized paper dust capturability and rubbing memory. However, the penetration level of the brush member 11 is not limited thereto, and may be in the range from at least 0.75 mm to not more than 1.25 mm, which allows combining both paper dust capturability and rubbing memory.

The baseline conditions under which the paper dust capturability was examined involved a density of the brush member 11 set to 170 kF/inch$^2$, and a penetration level set to 1.00 mm.

Characterizing Feature of the Present Embodiment

An explanation follows next on the effect of using a member with PTFE yarn as the material of the brush member 11 described above, with charging to the same charging polarity (negative polarity in the present embodiment) as that of toner, through triboelectric charging. An explanation follows also on the effect of a configuration, as Comparative example 1, in which a member that utilizes nylon yarn as a material of the brush member 11 is used, with charging to an opposite polarity (positive polarity in the present embodiment) to that of toner by triboelectric charging, and on the effect of a configuration, as Comparative example 2, in which no brush member is utilized.

Figure 4A:
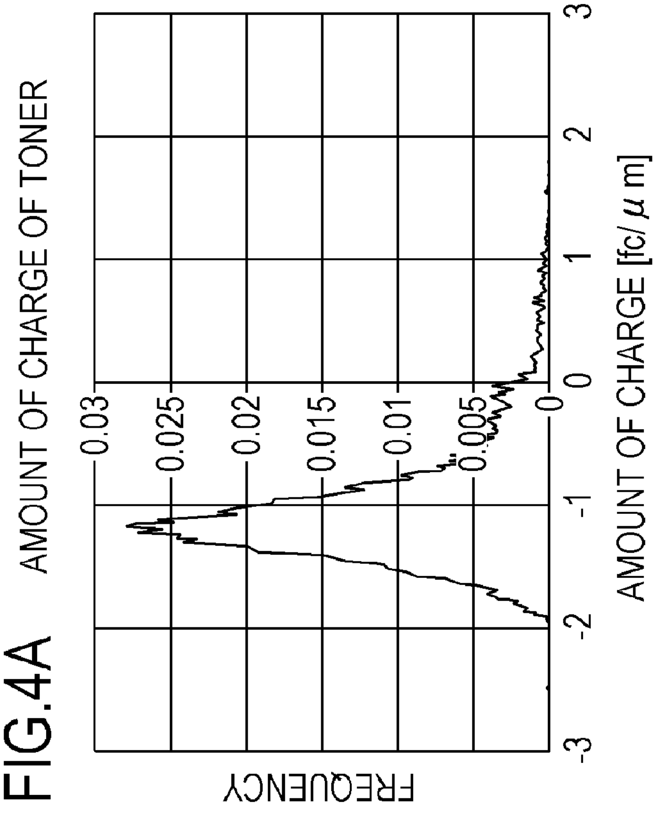
FIGS. 4A and 4B are schematic diagrams of an image forming apparatus in a variation of Embodiment 1.
Figure 4B:
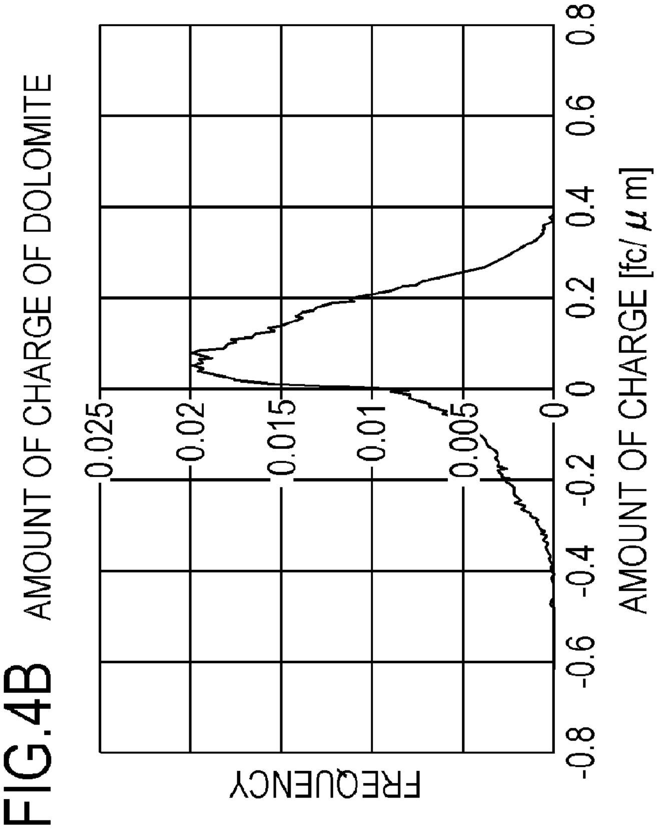

When paper dust migrates from the transfer material S to the photosensitive drum 1 in the transfer portion, also a filler that detaches off the transfer material S along with paper dust may in some instances migrate onto the photosensitive drum 1. There are various types of transfer material S, and there are likewise various types of fillers contained in the transfer material S. Some transfer materials S contain dolomite ($CaMg(CO_3)_2$) as a filler. Dolomite characteristically tends to become charged positively (in the present embodiment, opposite polarity to that of the toner), and also the position thereof in the triboelectric series tends to be on the opposite polarity side to the regular charging polarity of the toner. FIGS. 4A and 4B illustrate examples of the charge amount distributions of toner and dolomite. FIG. 4A illustrates the charge amount distribution of toner, and FIG. 4B illustrates the charge amount distribution of dolomite. The charge amount distribution is measured with the toner in a developed state, on the photosensitive drum 1, using an E-Spart Analyzer EST-G by Hosokawa Micron Corporation. The charge amount distribution for dolomite as the transfer material S is measured, with dolomite adhered to the photosensitive drum 1, upon running of JK-Ledger paper (product name, by JK PAPER LTD.).

An explanation follows next on problems caused by migration of dolomite from the photosensitive drum 1 to the developing roller 31, at the developing portion, and accumulation of dolomite in the developer accommodating chamber 33.

In a case where toner that is prone to become negatively charged and dolomite that is prone to become positively charged are mixed in the developer accommodating chamber 33, the triboelectric series difference that arises upon rubbing between the foregoing is significant, and the amount of charge of the toner is accordingly larger than that in ordinary triboelectric charging. As a result, the development/transfer voltage required in order to develop/transfer the toner increases, and sufficient development/transfer is not performed at the ordinary development/transfer voltage, which translates into a drop in image density.

In the present embodiment, therefore, PTFE prone to take on a negative polarity is used as the material of the brush member 11, to electrostatically collect dolomite having migrated to the photosensitive drum 1. In the case by contrast of Comparative example 1 that utilizes nylon prone to take on positive polarity, as the material of the brush member 11, and in the case of Comparative example 2 in which the brush member 11 is absent, dolomite having migrated to the photosensitive drum 1 cannot be collected electrostatically.

In order to compare the degree of accumulation of dolomite within the developer accommodating chamber 33, the toner remaining within the developer accommodating chamber 33 after output of 4000 prints of JK-Ledger (product name, by JK PAPER LTD.) is subjected to an X-ray fluorescence analysis; the results of a comparison versus the X-ray intensity of CaO are given in Table 3. Further, X-ray intensity was measured using a wavelength dispersive fluorescent X-ray analyzer "Supermini 200" by Rigaku Corporation.

TABLE 3

| | Brush member | X-ray intensity (CaO) | Drop in density |
|---|---|---|---|
| Example | PTFE | 1.68 | No |
| Comparative example 1 | Nylon | 7.17 | Yes |
| Comparative example 2 | No | 7.51 | Yes |

As Table 3 reveals, in the present embodiment the amount of CaO contained in the toner remaining in the developer accommodating chamber 33 is significantly smaller than that in the comparative example, i.e. there is a drop in the amount of dolomite accumulated in the developer accommodating chamber 33. As a result, it becomes possible to suppress drops in density derived from mixing of toner and dolomite.

As explained above, the configuration of the present embodiment allows outputting good images, unaffected by paper dust or fillers, also in image forming apparatuses of cleaner-less type.

Variation

For the purpose of achieving stable discharge in the charging portion, numerous image forming apparatuses are provided with a pre-exposure device 12 (pre-charging exposure portion) as a pre-charging exposure unit that eliminates the surface potential of the photosensitive drum 1 before entering the charging portion. In particular in the case of a configuration in which untransferred toner is charged and is collected at the developing portion, as in the image forming apparatus of the present embodiment, the pre-exposure device 12 eliminates static electricity from the photosensitive drum 1 after transfer, to elicit uniform discharge during charging, so that the untransferred toner can be stably charged as a result to negative polarity. In consequence, there is no toner that cannot be sufficiently re-charged to negative polarity, and untransferred toner can be collected more reliably in the developing portion.

Figure 5:
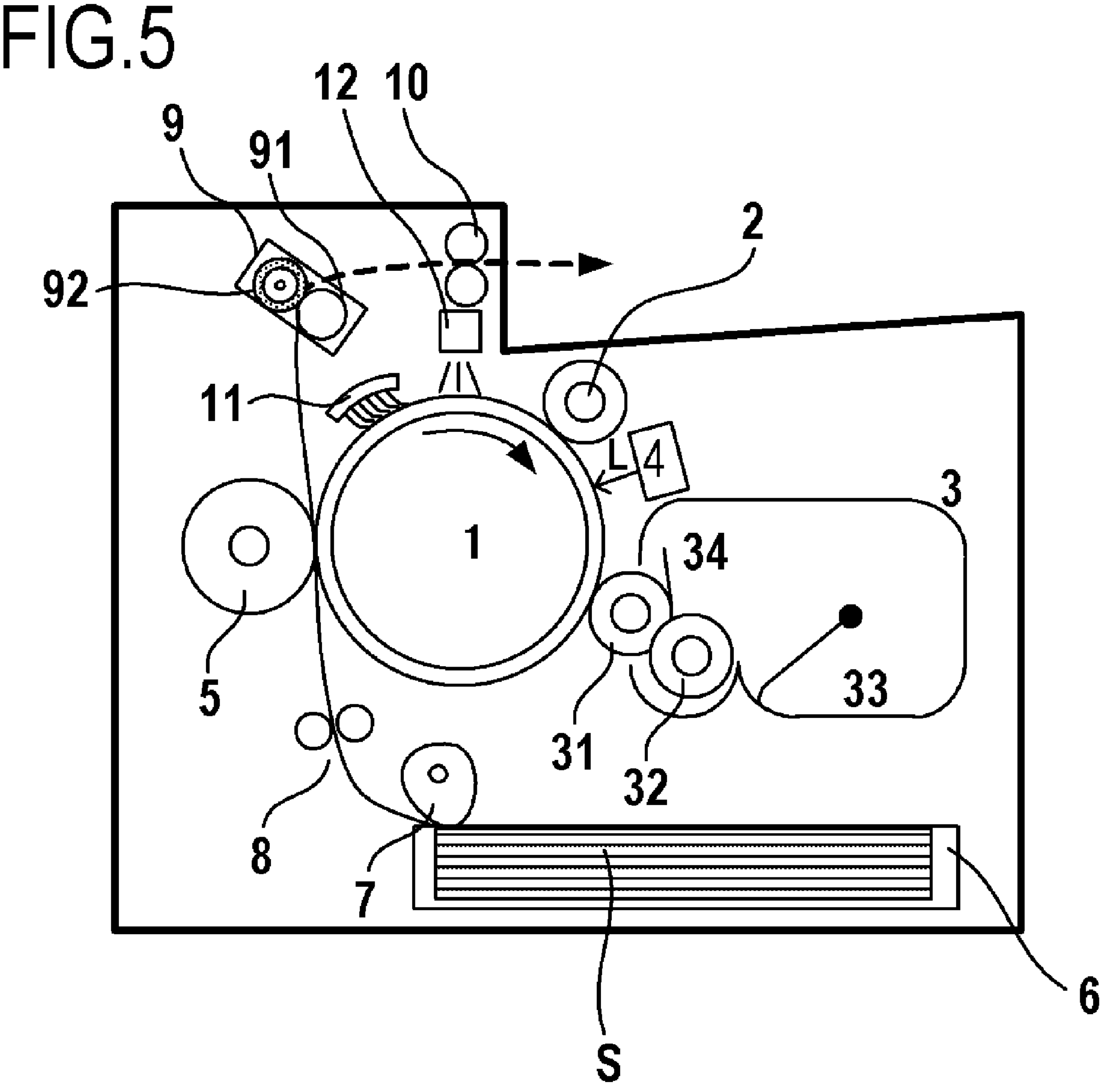
FIG. 5 is a charge amount distribution of toner and dolomite in Embodiment 1.

In such a configuration, as illustrated in FIG. 5, the brush member 11 is brought into contact with a portion, of the surface of the photosensitive drum 1, downstream of the transfer portion and upstream of the pre-exposure portion. By virtue of such a configuration uneven charging is evened out through static elimination by the pre-exposure device, so that image density non-uniformity is unlikelier to occur, even in the case of occurrence of the above-described rubbing memory in the photosensitive drum 1. Therefore, the penetration level of the brush member 11 can be increased, and slip-through of large-sized paper dust can be further suppressed.

Table 4 sets out a relationship between the penetration level of the brush member 11, the large-sized paper dust capturability and occurrence of rubbing memory, in the variation of the present embodiment.

TABLE 4

| Penetration level of brush member 11 | Paper dust capturability (0.8 mm or larger) Count | Determination | Density non-uniformity (rubbing memory) |
|---|---|---|---|
| 0.25 mm | 28 | NG | No |
| 0.50 mm | 19 | NG | No |
| 0.75 mm | 10 | OK | No |
| 1.00 mm | 7 | OK | No |
| 1.25 mm | 5 | OK | No |
| 1.50 mm | 3 | OK | No |
| 1.75 mm | 1 | OK | No |
| 2.00 mm | 0 | OK | Yes |
| 2.25 mm | 1 | OK | Yes |
| 2.50 mm | 0 | OK | Yes |

The penetration level of the brush member 11 in the variation of the present embodiment is set to 1.50 mm, on the basis of the above results. However, the penetration level of the brush member 11 is not limited thereto, and may be in a range from at least 0.75 mm to not more than 1.75 mm, which allows combining paper dust capturability and rubbing memory.

A configuration such as that described above allows achieving paper dust capturability and image density non-uniformity, with fewer development streaks caused by large-sized paper dust.

Embodiment 2

The configuration of the image forming apparatus in the present embodiment is similar to that of Embodiment 1, and an explanation thereof will be omitted. Silica is externally added to the surface of general toner. Silica has the property of being readily charged to negative polarity, such that the toner as a whole becomes charged as a result of silica charging.

When pressure is repeatedly exerted on the toner at for instance the developing portion, however, the silica on the surface is lost and charging performance decreases, i.e. the toner is no longer readily charged to negative polarity. Furthermore, in a case where a transfer material containing talc ($Mg_3Si_4O_{10}(OH)_2$) that is readily charged to the negative polarity is used as the filler, the talc collected in the developing portion and toner rub against each other and ultimately the toner is less readily charged to negative polarity as a result. In consequence the proportion of the toner charged to positive polarity, which is a non-regular polarity, increases significantly, and the toner flies towards the non-image formation portion at the developing portion, which results in image dirt. Hereinafter, image dirt arising from rubbing between toner and talc will be referred to as talc fogging. Unlike dolomite, the triboelectric series position of talc described above is at negative polarity, which is the same polarity as the regular polarity of the toner. The order of the triboelectric series including talc, dolomite, and brush member 11 is: (+) dolomite (paper dust)>(cellulose (paper dust) (general paper dust)>) photosensitive member surface layer>paper dust removal brush>talc (paper dust) (−).

In Embodiment 1, a configuration has been explained in which the brush member 11 is provided on the surface of the photosensitive drum 1, to capture paper dust and positively charged filler. In this case negatively charged talc is not captured by the brush member 11, but is collected at the developer accommodating chamber 33, where the collected talc rubs against the toner. As explained above, in the image forming apparatus described in Embodiment 1 talc fogging is likely to occur in a case where the transfer material S containing talc is used with toner in a deteriorated state.

It is an object of the present embodiment to provide an image forming apparatus in which drops in the charging performance of toner are curtailed, and talc fogging is suppressed, even when using a transfer material S containing talc.

In the present embodiment, a toner will be described that is capable of suppressing drops in charging performance. Specifically, the toner that is used has a toner particle containing a binder resin and a colorant, and has a Martens hardness when measured under conditions of maximum load of $2.0\times10^{-4}$ [N] (hereinafter referred to as the Martens hardness) of at least 200 MPa and not more than 1100 MPa. This improved toner has high wear resistance, and hence surface changes are suppressed even when repeatedly acted upon by to pressure in the developing portion; also, the proportion of toner charged to positive polarity, which is a non-regular polarity, does not increase even when the toner rubs against talc, and thus talc fogging is suppressed.

The improved toner will be explained in detail next.

Martens Hardness

Hardness, as one mechanical property of the surface or vicinity of the surface of an object, is the resistance to deformation or scratching of that object by foreign matter acting so as to deform the object. Hardness is defined in various ways and measured in accordance with values measurement methods. For instance, the method for measuring hardness is different depending on the size of the measurement region; herein the Vickers method is often used for measurement regions that are 10 μm or larger, nanoindentation for measurement regions that are 10 μm or smaller, and AFM or the like for measurement regions that are 1 μm or smaller. In terms of definition, for instance Brinell hardness and Vickers hardness apply to indentation hardness, Martens hardness to scratch hardness, and Shore hardness to rebound hardness.

Nanoindentation is preferably used in toner measurements, since the general particle diameter of toner is from 3 μm to 10 μm. Studies by the inventors have revealed that Martens hardness, which denotes scratch hardness, is appropriate as the definition of hardness for bringing out the effect of the present invention. This is ostensibly because scratch hardness can represent the strength of toner against being scratched by a hard substance, such as metals and external additives, within a developing machine.

The method for measuring the Martens hardness of toner by nanoindentation involves calculating the hardness from a load-displacement curve obtained according to the procedure of the indentation test prescribed in ISO14577-1, in a commercially available device compliant with ISO14577-1. In the present invention, an ultra-micro-indentation hardness tester "ENT-1100b" (by Elionix Inc.) was used as the above device compliant with the ISO standard. The measuring method is described in the "ENT1100 Operation Manual" ancillary to the device; a concrete measuring method is as follows.

The measurement environment was maintained at 30.0° C. within a shield case in an ancillary temperature controller. Keeping the ambient temperature constant is herein effective in reducing variability in measurement data that arises for instance on account of thermal expansion and drift. The set temperature was set to 30.0° C., as the envisaged temperature in the vicinity of the developing machine where the toner is rubbed. The toner was applied using a standard sample table ancillary to the device, as a sample stand, and thereafter air was blown slightly so as to disperse the toner, and the sample stand was set in the device and was held for 1 hour or longer, after which the measurement was carried out.

The indenter used in the measurement was a flat indenter with a flat 20 μm square tip (titanium indenter with a diamond tip) attached to the device. Flat indenters are used for small-diameter and spherical objects such as toner, objects with external additives adhered thereto, and objects with irregularities on the surface, since the use of sharp indenters exerts a significant influence on measurement precision. The maximum load in the test is set to $2.0\times10^{-4}$ N. By setting this test load, it becomes possible to measure hardness without damaging the surface layer of the toner under conditions corresponding to the stress received by one toner particle in the developing portion. Abrasion resistance is a major issue in the present invention, and accordingly it is important to measure hardness while preserving the surface layer without breakage.

As particles to be measured, there are selected particles in which toner is present alone on a measurement screen (field size: width 160 μm, length 120 μm) of the microscope attached to the apparatus. In order to eliminate errors in the displacement amount as much as possible, particles are however selected that have a particle diameter (D) lying in a range of number-average particle diameter (D1) thereof ±0.5 μm (i.e. $D1-0.5\ \mu m \leq D \leq D1+0.5\ \mu m$). In the measurement of the particle diameter of particles to be measured, the major axis and the minor axis of the toner were measured using software ancillary the device, and [(major axis+minor axis)/2] was taken as the particle diameter D (μm). The number-average particle diameter is measured using "Coulter counter Multisizer 3" (by Beckman Coulter Inc.) in accordance with the method described further on.

At the time of measurement, 100 arbitrary toner particle having a particle diameter D (μm) satisfying the above conditions are selected and measured. Input conditions at the time of measurement are as follows.

Test mode: load-unload test
Test load: 20.000 mgf ($2.0\times10^{-4}$ N)
Number of divisions: 1000 steps
Step interval: 10 msec The analysis menu "Data analysis (ISO)" is selected and the measurement is executed, whereupon the Martens hardness is analyzed by the software ancillary to the device, and is outputted. The above measurement was performed on 100 toner particle, and the arithmetic mean value thereof was taken as the Martens hardness in the present invention.

Explanation of Improved Toner

As described above a toner having a toner particle containing a binder resin and a colorant and having a Martens hardness of at least 200 MPa and not more than 1100 MPa is used in the present embodiment. The means for adjusting the Martens hardness to at least 200 MPa and not more than 1100 MPa when measured under the condition of a maximum load of $2.0\times10^{-4}$ N is not particularly limited. However, the above hardness is significantly greater than the hardness of organic resins used in general toners, and hence is difficult to achieve by relying on means ordinarily resorted to in order to increase hardness. For instance, the above hardness is difficult to achieve by resorting for instance to a means for designing a resin having a high glass transition temperature, or a means for increasing the molecular weight of the resin, or a thermal curing means, or a means for adding a filler to the surface layer.

The Martens hardness of the organic resin used in general toners is about 50 MPa to 80 MPa when measured under conditions of maximum load of about $2.0\times10^{-4}$ N. The hardness is about 120 MPa or less even when raised for instance through resin design or through an increase in molecular weight. Further, the Martens hardness is about 180 MPa or less even when the vicinity of the surface layer is filled with a filler such as a magnetic body or silica, followed by thermal curing, and thus the toner of the present invention is significantly harder than general toners.

Means for adjusting the above specific hardness range include for instance a method for forming the surface layer of the toner out of a substance, such as an inorganic substance, having an appropriate hardness, and controlling the chemical structure or a macrostructure of the surface layer so as to confer appropriate hardness.

Concrete examples of substances that can exhibit the above specific hardness include organosilicon polymers. Hardness can be adjusted on the basis of for instance the length of a carbon chain or the number of carbon atoms that are directly bonded to the silicon atoms of the organosilicon polymer, as an instance of material selection. The toner particle has a surface layer that contains an organosilicon polymer, and preferably, the number of carbon atoms directly bonded to the silicon atoms of the organosilicon polymer is on average at least 1 and not more than 3 per silicon atom, since in that case hardness is readily adjusted to the above specific hardness. The number of carbon atoms directly bonded to the silicon atoms of the organosilicon polymer is preferably at least 1 and not more than 2, and is more preferably 1, per silicon atom.

A means for adjusting the Martens hardness on the basis of the chemical structure may involve adjusting the chemical structure for instance in terms of crosslinking and degree of polymerization in the surface layer material. A macrostructure-based means for adjusting the Martens hardness may involve adjusting the ruggedness of the surface layer or adjusting a network structure that links protrusions on the surface layer. In a case where an organosilicon polymer is used as the surface layer, such adjustments can be accomplished by adjusting for instance the pH, concentration, temperature and duration in a pretreatment of the organosilicon polymer. The above adjustments can also be accomplished on the basis of for instance the timing, manner, concentration and reaction temperature at the time of formation of the surface layer of the organosilicon polymer on a core particle of the toner.

The method below is particularly preferable in the present invention. Firstly, core particles of a toner containing a binder resin and a colorant are produced and are dispersed in an aqueous medium, to obtain a core particle dispersion. Dispersing of the core particles is preferably carried out so that the concentration of the core particles at this time, on a solids basis, is at least 10 mass % and not more than 40 mass % with respect to the total amount of the core particle dispersion. The temperature of the core particle dispersion is preferably adjusted to 35° C. or above. Preferably, the pH of the core particle dispersion is adjusted to a pH at which condensation of the organosilicon compound does not proceed readily. The pH at which condensation of the organosilicon polymer does not proceed readily varies depending on the relevant substance, but lies preferably within the range of ±0.5, centered on the pH at which the reaction proceeds the least readily. A hydrolyzed organosilicon compound is preferably used herein. For instance, the organosilicon compound is hydrolyzed in a separate vessel, as a pretreatment of the organosilicon compound. Taking the amount of the organosilicon compound as 100 parts by mass, the hydrolysis charging concentration is preferably at least 40 parts by mass and not more than 500 parts by mass, more preferably at least 100 parts by mass and not more than 400 parts by mass, of water such as ion-exchanged water or RO water having had an ion fraction removed therefrom. Hydrolysis conditions include preferably a pH of 2 to 7, a temperature of 15° C. to 80° C., and a duration of 30 to 600 minutes.

The obtained hydrolysis solution and the core particle dispersion are mixed and adjusted to a pH (preferably 6 to 12, or 1 to 3, more preferably 8 to 12) suitable for condensation, as a result of which a surface layer of the organosilicon compound can be formed on the core particle surface of the toner while the organosilicon compound is caused to condense. Condensation and surface layer formation are preferably carried out at 35° C. or above for 60 minutes or longer. The macrostructure of the surface can be adjusted by adjusting the time of holding at 35° C. or above prior to adjustment of the pH to a pH suitable for condensation. However, the holding time is preferably at least 3 minutes and not more than 120 minutes in order to readily achieve a specific Martens hardness.

Figure 7:
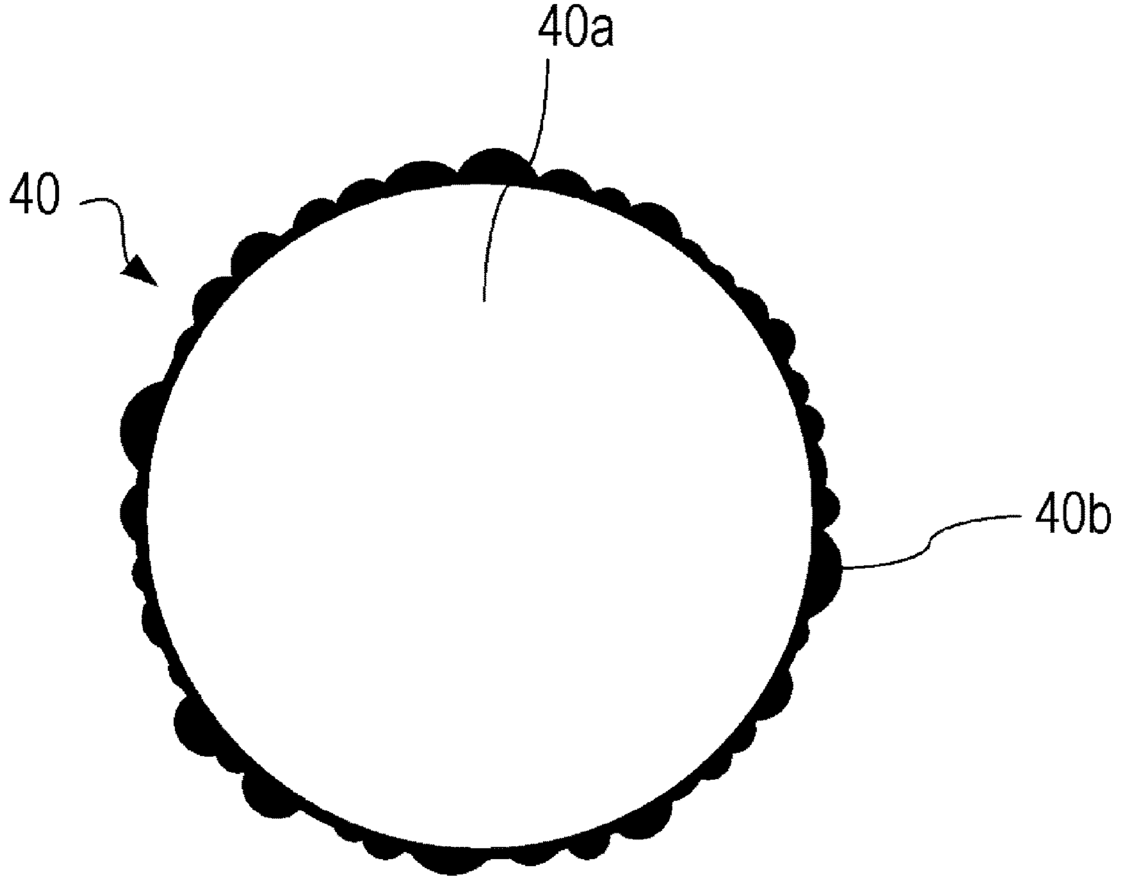
FIG. 7 is a schematic diagram of toner in Embodiment 1.

FIG. 7 illustrates a cross-sectional diagram of a toner particle in Embodiment 2. By resorting to means such as those above, the reaction residue can be reduced, unevenness can be formed on the surface layer 40*b*, as illustrated in FIG. 7, and a network structure can be further formed between protrusions; accordingly, a toner having the above specific Martens hardness can be readily obtained.

In a case where a surface layer 40*b* is used that contains an organosilicon polymer, the fixing ratio of the organosilicon polymer is preferably at least 90% and not more than 100%. More preferably, the fixing ratio is 95% or higher. If the fixing ratio is within this range, the change in Martens hardness for durable use is small, and charging can be maintained. A method for measuring the fixing ratio of the organosilicon polymer will be described further on.

Surface Layer

In case where the toner particle has a surface layer, the surface layer 40*b* is herein a layer that covers the toner core particle 40*a* and is present on the outermost surface of a toner particle 40. The surface layer containing the organosilicon polymer is much harder than a conventional toner particle. Accordingly, it is also preferable, from the viewpoint of fixing performance, to provide a portion at which the surface layer is not formed, on part of the surface of the toner particle.

The proportion of the number of dividing axes at which the thickness of the surface layer that contains the organosilicon polymer is 2.5 nm or less (hereafter also referred to as the proportion of the surface layer having a thickness of 2.5 nm or less) is preferably 20.0% or less. This condition approximates a situation where at least 80.0% of the surface of the toner particle is made up of a surface layer containing a 2.5 nm or thicker organosilicon polymer. Specifically, the core surface is sufficiently covered by the surface layer containing the organo silicon polymer when this condition is satisfied. More preferably, the above proportion is 10.0% or less. In a measurement thereof, the proportion can be determined through observation of cross sections using a transmission electron microscope (TEM); details are described further on.

Surface Layer Containing an Organosilicon Polymer

In a case where the toner particle has a surface layer containing an organosilicon polymer, the organosilicon polymer preferably has a substructure represented by Formula (1).

$$R—SiO_{3/2} \quad \text{Formula (1)}$$

(R represents a C1 to C6 hydrocarbon group.)

In the organosilicon polymer having the structure of Formula (1) one of the four valences of Si atoms is bonded to R and the remaining three are bonded to O atoms. The O atoms are in a state in which both valences thereof are bonded to Si, that is, the O atoms form siloxane bonds (Si—O—Si). Considering Si atoms and O atoms in the entirety of the organosilicon polymer, given that the organosilicon polymer has three O atoms per two Si atoms, the organosilicon polymer is represented by $—SiO_{3/2}$. It is considered that the $—SiO_{3/2}$ structure of this organosilicon polymer has properties similar to those of silica ($SiO_2$) made up of multiple siloxane bonds. Therefore, it is considered that the Martens hardness can be increased since in that case the structure is closer to that of an inorganic substance, as compared with toners the surface layer of which is formed by conventional organic resins.

In a chart obtained by measuring the $^{29}$Si-NMR of the tetrahydrofuran (THF) insoluble fraction of the toner particle, the proportion of the peak area attributable to the structure of Formula (1) relative to the total peak area of the organosilicon polymer is preferably 20% or higher. Although the detailed measurement method involved is described further on, such a peak area ratio approximates a situation where the organosilicon polymer included in the toner particle has 20% or more of the substructure represented by $R—SiO_{3/2}$.

As pointed out above, the meaning of the $—SiO_{3/2}$ substructure is that three of four valences of a Si atom are bonded to oxygen atoms, while these oxygen atoms are bonded to separate Si atoms. If one of these oxygens is a silanol group, then the substructure of the organosilicon polymer is represented by $R—SiO_{2/2}—OH$. Further, if two oxygens are silanol groups, then the substructure is $R—SiO_{1/2}(—OH)_2$. In a comparison of these structures, the structure with more oxygen atoms forming a crosslinked structure with Si atom is closer herein to the silica structure represented by $SiO_2$. Therefore, the greater the abundance of the $—SiO_{3/2}$ skeleton, the lower the surface free energy on the surface of the toner particle can be made, which results in superior effects in terms of environmental stability and resistance to member contamination.

Resins of low Tg (40° C. or lower) and resins of low molecular weight (Mw 1000 or less) prone to resulting in release agent outmigration, and present inward of the surface layer, are curtailed herein by virtue of the durability that is brought about by the substructure represented by Formula (1) and the hydrophobicity and charging performance of R in Formula (1). Also bleeding of the release agent can be suppressed, depending on the circumstances. The proportion of the peak area of the substructure represented by Formula (1) can be controlled on the basis of the type and amount of the organosilicon compound that is used for forming the organosilicon polymer and on the basis of the reaction temperature, reaction time, reaction solvent and pH involved in the hydrolysis, addition polymerization and condensation polymerization in the formation of the organosilicon polymer.

Preferably, R in the substructure represented by Formula (1) is a C1 to C6 hydrocarbon group. Charge amount tends to be stable as a result. In particular, R in the substructure represented by Formula (1) is preferably a C1 to C5 aliphatic hydrocarbon group or a phenyl group, which are excellent in environmental stability.

In the present invention, R is more preferably a C1 to C3 aliphatic hydrocarbon group, in order to further improve charging performance and fogging prevention. When charging performance is good, transferability is likewise good and there remains little untransferred toner, and contamination of the drum, the charging member, and the transfer member is improved upon as a result.

Preferred examples of the C1 to C3 aliphatic hydrocarbon group include a methyl group, an ethyl group, a propyl group and a vinyl group. From the viewpoint of environmental stability and storage stability, R is more preferably a methyl group.

A sol-gel method is preferable as a production example of the organosilicon polymer. The sol-gel method is a method in which a liquid starting material, used as a starting material, is hydrolyzed and subjected to condensation polymerization, to be gelled through a sol state, the method being used for synthesizing glass, ceramics, organic-inorganic hybrids, and nanocomposites. By relying on this production method it becomes possible to produce functional materials having various shapes such as surface layers, fibers, bulk bodies and fine particles, at a low temperature, from a liquid phase.

Specifically, the organosilicon polymer present on the surface layer of the toner particle is preferably produced by hydrolysis and condensation polymerization of a silicon compound typified by alkoxysilanes. By providing the surface layer containing the organosilicon polymer on the toner particle it becomes possible to obtain a toner surface excellent in storage stability, the toner having improved environmental stability and being less likely to suffer deterioration of toner performance over long-term use.

Moreover, the sol-gel method starts from a liquid that is then gelled to form a material, and thus various microstructures and shapes can be created as a result. In a case in particular where the toner particle is produced in an aqueous medium, ready precipitation on the surface of the toner particle is elicited by the hydrophilicity derived from hydrophilic groups such as the silanol group in the organosilicon compound. The above microstructures and shapes can be adjusted for instance on the basis of the reaction temperature, reaction time, reaction solvent, pH, as well as type and amount of organosilicon compound.

The organosilicon polymer on the surface layer of the toner particle is preferably a condensation polymerization product of an organosilicon compound having a structure represented by Formula (Z) below.

[C1]

(Z)

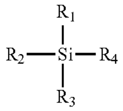

(In Formula (Z), $R_1$ represents a C1 to C6 hydrocarbon group, and $R_2$, $R_3$ and $R_4$ each independently represent a halogen atom, a hydroxy group, an acetoxy group or an alkoxy group.)

Hydrophobicity can be enhanced by the hydrocarbon group of $R_1$ (preferably an alkyl group), and a toner particle having excellent environmental stability can then be accordingly obtained. As the hydrocarbon group there can be used also an aryl group, for instance a phenyl group, being an aromatic hydrocarbon group. In a case where $R_1$ is significantly hydrophobic, the amount of charge tends to exhibit significant fluctuations in the amount of charge in different environments; with environmental stability in mind, therefore, $R_1$ is preferably a C1 to C3 aliphatic hydrocarbon group, and more preferably a methyl group. Further, $R_2$, $R_3$, and $R_4$ are each independently a halogen atom, a hydroxy group, an acetoxy group or an alkoxy group (hereafter also referred to as reactive groups). These reactive groups form a crosslinked structure by undergoing hydrolysis, addition polymerization and condensation polymerization, such that a toner can be obtained that exhibits excellent resistance to member contamination and exhibits excellent development durability. Herein a C1 to C3 alkoxy group is preferable, and more preferably a methoxy group or an ethoxy group, from the viewpoint of achieving mild hydrolyzability at room temperature, and in terms of precipitation on the surface of the toner particle and coatability. Further, hydrolysis, addition polymerization and condensation polymerization of $R_2$, $R_3$ and $R_4$ can be controlled on the basis of the reaction temperature, reaction time, reaction solvent and pH. An organosilicon compound (hereafter also referred to as trifunctional silane) having three reactive groups ($R_2$, $R_3$ and $R_4$) in the molecule other than $R_1$ in the above Formula (Z) may be used singly or in combination of two or more types, in order to obtain the organosilicon polymer used in the present invention.

Examples of the compound represented by Formula (Z) include:

trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane and methyldiethoxyhydroxysilane.

Trifunctional silanes such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane and hexyltrihydroxysilane.

Trifunctional phenylsilanes such as phenyltrimethoxysilane, phenyltriethoxysilane, phenyltrichlorosilane, phenyltriacetoxysilane and phenyltrihydroxysilane.

Further, an organosilicon polymer may be used that is obtained by concomitantly using an organosilicon compound below, along with an organosilicon compound having a structure represented by Formula (Z), so long as the effect of the present invention is not impaired in doing so. Organosilicon compounds having four reactive groups in the molecule (tetrafunctional silanes), organosilicon compounds having two reactive groups in the molecule (bifunctional silanes) and organosilicon compounds having one reactive group in the molecule (monofunctional silanes). Examples include for instance the following.

Trifunctional vinylsilanes such as dimethyldiethoxysilane, tetraethoxysilane, hexamethyldi silazane, 3-aminopropyl trimethoxysilane, 3-aminopropyltrimethoxysilane, 3-(2-aminoethyl)aminopropyl trimethoxysilane, 3-(2-aminoethyl)aminopropyltriethoxysilane, vinyltriisocyanatesilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane and vinyldiethoxyhydroxysilane.

The content of the organosilicon polymer in the toner particle is preferably at least 0.5 mass % and not more than 10.5 mass %.

The surface free energy of the surface layer can be further reduced, flowability increased, and the occurrence of member contamination and fogging suppressed, by having the content of the organosilicon polymer being 0.5 mass % or higher. Charge-up can be made unlikelier to occur by having the content of the organosilicon polymer being 10.5 mass % or lower. The content of the organosilicon polymer can be controlled on the basis of the type and amount of the organosilicon compound used for forming the organosilicon polymer, and on the basis of the toner particle production method, reaction temperature, reaction time, reaction solvent and pH involved in the formation of the organosilicon polymer.

Preferably, the toner core particle and the surface layer containing the organosilicon polymer are in contact with each other without any intervening gaps. As a result it becomes possible to achieve a toner that is excellent in storage stability, environment stability and development durability, while suppressing the occurrence of bleeding derived for instance from a resin component and/or release agent, inward of the surface layer of the toner particle. Besides the organosilicon polymer, the surface layer may contain for instance various resins such as a styrene-acrylic copolymer resin, a polyester resin and a urethane resin, and various additives.

Binder Resin

The toner particle contains a binder resin. The binder resin is not particularly limited, and conventionally known binder resins can be used. Preferred herein are for instance vinyl resins and polyester resins. Examples of vinyl resins, polyester resins and other binder resins include for instance the following resins and polymers.

Homopolymers of styrene and derivatives thereof such as polystyrene and polyvinyltoluene; styrenic copolymers such as styrene-propylene copolymers, styrene-vinyltoluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers and styrene-maleate ester copolymers; and polymethyl methacrylate, polybutyl methacrylate, polyvinyl acetate, polyethylene, polypropylene, polyvinyl butyral, silicone resins, polyamide resins, epoxy resins, polyacrylic resins, rosin, modified rosin, terpene resins, phenolic resins, aliphatic or alicyclic hydrocarbon resins, aromatic petroleum resins and the like. These binder resins may be used singly or in mixtures thereof.

Preferably, the binder resin contains a carboxy group, from the viewpoint of charging performance; preferably, the binder resin is a resin produced using a polymerizable monomer that contains a carboxy group. Examples include for instance acrylic acid; derivatives of α-alkyl unsaturated carboxylic acids and derivatives of β-alkyl unsaturated carboxylic acids such as methacrylic acid, α-ethylacrylic acid and crotonic acid; unsaturated dicarboxylic acids such as fumaric acid, maleic acid, citraconic acid and itaconic acid; and unsaturated dicarboxylic acid monoester derivatives such as monoacryloyloxyethyl succinate, succinic acid monoacryloyloxyethylene ester, monoacryloyloxyethyl phthalate, and monomethacryloyloxyethyl phthalate.

A polyester resin obtained through condensation polymerization of the carboxylic acid components and alcohol components below can be used as the polyester resin. Examples of the carboxylic acid component include terephthalic acid, isophthalic acid, phthalic acid, fumaric acid, maleic acid, cyclohexanedicarboxylic acid and trimellitic acid. Examples of the alcohol component include bisphenol A, hydrogenated bisphenol, ethylene oxide adducts of bisphenol A, propylene oxide adducts of bisphenol A, glycerin, trimethylolpropane and pentaerythritol.

The polyester resin may be a polyester resin containing urea groups. In the polyester resin, carboxyl groups for instance at termini are preferably uncapped.

The binder resin may have polymerizable functional groups for the purpose of improving the change in the viscosity of the toner at a high temperature. Examples of the polymerizable functional groups include vinyl groups, isocyanate groups, epoxy groups, amino groups, carboxy groups and hydroxy groups.

Crosslinking Agent

A crosslinking agent may be added, at the time of polymerization of the polymerizable monomer, for the purpose of controlling the molecular weight of the binder resin.

Examples include for instance ethylene glycol dimethacrylate, ethylene glycol diacrylate, diethylene glycol dimethacrylate, diethylene glycol diacrylate, triethylene glycol dimethacrylate, triethylene glycol diacrylate, neopentylglycol dimethacrylate, neopentylglycol diacrylate, divinylbenzene, bis (4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentylglycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, a polyester-type diacrylate (MANDA by Nippon Kayaku Co. Ltd.), as well as methacrylates of the foregoing.

The addition amount of the crosslinking agent is preferably at least 0.001 parts by mass and not more than 15.000 parts by mass with respect to 100 parts by mass of polymerizable monomer.

Release Agent

Preferably, the toner particle contains a release agent. Examples of the release agent that can be used in the toner particle include petroleum waxes and derivatives thereof such as paraffin wax, microcrystalline wax, and petrolatum; montan wax and derivatives thereof; hydrocarbon waxes derived from the Fischer-Tropsch method; polyolefin waxes and derivatives thereof such as polyethylene and polypropylene; natural waxes and derivatives thereof such as carnauba wax and candelilla wax; fatty acids and derivatives thereof such as higher fatty alcohols, stearic acid, palmitic acid, or acid amides, esters, and ketones thereof; hardened castor oil and derivatives thereof; as well as vegetable waxes, animal waxes and silicone resins. The above derivatives include oxides, block copolymers with vinylic monomers, and graft-modified products.

The content of the release agent is at least 5.0 parts by mass and not more than 20.0 parts by mass relative to 100.0 parts by mass of the binder resin or the polymerizable monomer.

Colorant

The toner particle contains a colorant. The colorant is not particularly limited, and for instance one of the known colorants below can be used herein.

Examples of black pigments include carbon black, aniline black, non-magnetic ferrite, magnetite, and pigments resulting from color matching to black using the below-described yellow colorants, red colorants and blue colorants. These colorants can be used singly or in mixtures thereof, and also in a solid solution state.

Examples of color colorants include the following. Examples of yellow pigments include yellow iron oxide, Naples yellow, Naphthol Yellow S, condensed azo compounds such as Hansa Yellow G, Hansa Yellow 10G, Benzidine Yellow G, Benzidine Yellow GR, Quinoline Yellow Lake, Permanent Yellow NCG, and Tartrazine Lake, as well as isoindolinone compounds, anthraquinone compounds, azo metal complexes, methine compounds and allylamide compounds. Specific examples include the following.

C.I. Pigment Yellow 12, 13, 14, 15, 17, 62, 74, 83, 93, 94, 95, 109, 110, 111, 128, 129, 147, 155, 168 and 180.

Orange pigments include the following.

Permanent Orange GTR, Pyrazolone Orange, Balkan Orange, Benzidine Orange G, Indanthrone Brilliant Orange RK and Indanthrone Brilliant Orange GK.

Examples of red pigments include condensed azo compounds such as red iron oxide, Permanent Red 4R, Resole Red, Pyrazolone Red, Watching red calcium salt, Lake Red C, Lake Red D, Brilliant Carmine 6B, Brilliant Carmine 3B, Eosin Lake, Rhodamine Lake B and Alizarin Lake, as well as diketopyrrolopyrrole compounds, anthraquinone compounds, quinacridone compounds, basic dye lake compounds, naphthol compounds, benzimidazolone compounds, thioindigo compounds and perylene compounds. Specific examples include the following.

C.I. Pigment Red 2, 3, 5, 6, 7, 23, 48:2, 48:3, 48:4, 57:1, 81:1, 122, 144, 146, 166, 169, 177, 184, 185, 202, 206, 220, 221 and 254.

Examples of blue pigments include alkali blue lake, Victoria blue lake, copper phthalocyanine compounds and derivatives thereof such as phthalocyanine blue, metal-free phthalocyanine blue, phthalocyanine blue partial chloride, Fast Sky Blue and Indanthrone Blue BG, as well as anthraquinone compounds and basic dye lakes. Specific examples include the following.

C.I. Pigment Blue 1, 7, 15, 15:1, 15:2, 15:3, 15:4, 60, 62 and 66.

Examples of violet pigments include Fast Violet B and Methyl Violet Lake.

Examples of green pigments include Pigment Green B, Malachite Green Lake and Final Yellow Green G. Examples of white pigments include zinc white, titanium oxide, antimony white and zinc sulfide.

The colorant may be subjected to a surface treatment, as needed, with a substance that does not inhibit polymerization. The content of the colorant is at least 3.0 parts by mass and not more than 15.0 parts by mass relative to 100.0 parts by mass of the binder resin or the polymerizable monomer.

Toner Particle Production Method

A known means may be used as the method for producing the toner particle; a kneading pulverization method or wet production method can be used herein. A wet production method can be preferably resorted to from the viewpoint of shape control and making particle diameter uniform. Examples of wet production methods include suspension polymerization, dissolution suspension, emulsion polymerization aggregation, and emulsion aggregation.

A suspension polymerization method will be explained here. Firstly, a polymerizable monomer composition is prepared in which a polymerizable monomer for producing a binder resin, a colorant and as needed other additives are uniformly dissolved or dispersed using a disperser such as a ball mill or an ultrasonic disperser (step of preparing a polymerizable monomer composition). In this case, a multifunctional monomer and/or chain transfer agent can be added, as needed, and for instance a wax, a charge control agent or a plasticizer as a release agent can further be added as appropriate. The vinylic polymerized monomers illustrated below can be suitably exemplified as the polymerizable monomer in suspension polymerization.

Styrene; styrene derivatives such as α-methyl styrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxy styrene, p-phenylstyrene and the like; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethylphosphate ethyl acrylate, diethylphosphate ethyl acrylate, dibutylphosphate ethyl acrylate and 2-benzoyloxyethyl acrylate; methacrylic polymerizable monomers such as methyl methacrylate, ethyl methacrylate, n-propyl methacrylate, iso-propyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethylphosphate ethyl methacrylate and dibutylphosphate ethyl methacrylate; methylene aliphatic monocarboxylic acid esters; vinyl esters such as vinyl acetate, vinyl propionate, vinyl benzoate, vinyl butyrate, and vinyl formate; vinyl ethers such as vinyl methyl ether, vinyl ethyl ether and vinyl isobutyl ether; as well as vinyl methyl ketone, vinyl hexyl ketone and vinyl isopropyl ketone.

The polymerizable monomer composition is charged next into an aqueous medium prepared beforehand, and droplets made up of the polymerizable monomer composition are formed, to the desired toner particle diameter, using a stirrer or disperser that delivers high shear forces (granulating step).

Preferably, the aqueous medium in the granulating step contains a dispersion stabilizer, for the purpose of controlling the particle size of the toner particle, making the particle diameter distribution sharper, and suppressing coalescence of toner particle in the production process. Generally, dispersion stabilizers are broadly classified into polymers that exhibit repulsive force due to steric hindrance, and into poorly water-soluble inorganic compounds for dispersion stabilization by electrostatic repulsive forces. Fine particles of the poorly water-soluble inorganic compound are dissolved by acids or alkalis, and accordingly such compounds are preferably used, since in that case particles can be easily removed, after polymerization, through dissolution by being washed with an acid or an alkali.

Preferably, a dispersion stabilizer containing any one from among magnesium, calcium, barium, zinc, aluminum and phosphorus can be used herein as the dispersion stabilizer of a poorly water-soluble inorganic compound. More preferably, the dispersion stabilizer contains any one from among magnesium, calcium, aluminum and phosphorus. Specific examples include the following.

Magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate and hydroxyapatite. An organic compound such as polyvinyl alcohol, gelatin, methyl cellulose, methyl hydroxypropyl cellulose, ethyl cellulose, sodium carboxymethyl cellulose or starch may be used concomitantly with the dispersion stabilizer. Preferably, the dispersion stabilizer is used in an amount at least 0.01 parts by mass and not more than 2.00 parts by mass with respect to 100 parts by mass of the polymerizable monomer.

For the purpose of making the dispersion stabilizer finer, a surfactant may be used concomitantly in an amount of at least 0.001 parts by mass and not more than 0.1 parts by mass relative to 100 parts by mass of the polymerizable monomer. Specifically, commercially available nonionic, anionic, and cationic surfactants can be used herein. For instance, there is preferably used sodium dodecyl sulfate, sodium tetradecyl sulfate, sodium pentadecyl sulfate, sodium octyl sulfate, sodium oleate, sodium laurate, potassium stearate or calcium oleate.

After or during the granulating step, the temperature is preferably set to at least 50° C. and not more than 90° C., and the polymerizable monomer included in the polymerizable monomer composition is then polymerized, to yield a toner particle dispersion (polymerization step).

In the polymerization step, a stirring operation is preferably carried out so that the temperature distribution in the vessel becomes uniform. In a case where a polymerization initiator is to be added, this can be accomplished at an arbitrary timing and over a required lapse of time. For the purpose of achieving a desired molecular weight distribution, the temperature may be raised in the latter half of the polymerization reaction, and in order to remove unreacted polymerizable monomer, by-products and the like out of the system, part of the aqueous medium may be distilled off in a distillation operation, in the latter half of the reaction or once the reaction is over. The distillation operation can be carried out under normal pressure or under reduced pressure.

An oil-soluble initiator is generally used as the polymerization initiator that is utilized in suspension polymerization. Examples include for instance the following.

Azo compounds such as 2,2'-azobisisobutyronitrile, 2,2'-azobis-2,4-dimethylvaleronitrile, 1,1'-azobis (cyclohexane-1-carbonitrile), 2,2'-azobis-4-methoxy-2,4-dimethylvaleronitrile and the like; and peroxide-based initiators such as acetylcyclohexylsulfonyl peroxide, diisopropyl peroxy carbonate, decanoyyl peroxide, lauroyl peroxide, stearoyl peroxide, propionyl peroxide, acetyl peroxide, tert-butylperoxy-2-ethylhexanoate, benzoyl peroxide, tert-butylperoxyisobutyrate, cyclohexanone peroxide, methyl ethyl ketone peroxide, dicumyl peroxide, tert-butylhydroperoxide, di-tert-butylperoxide, tert-butylperoxypivalate and cumenehydroperoxide.

A water-soluble initiator may be concomitantly used, as needed, as the polymerization initiator; examples thereof include the following. Ammonium sulphate, potassium persulfate, 2,2'-azobis(N,N'-dimethyleneisobutyroamidine)hydrochloride, 2,2'-azobis(2-amidinopropane)hydrochloride, azobis(isobutylamidine)hydrochloride, sodium 2,2'-azobisisobutyronitrile sulfonate, ferrous sulfate and hydrogen peroxide.

These polymerization initiators can be used singly or in combinations of two or more types; further, a chain transfer agent, a polymerization inhibitor or the like can be added and used in order to control the degree of polymerization of the polymerizable monomer.

The weight-average particle diameter of the toner particle is preferably at least 3.0 μm and not more than 10.0 μm, from the viewpoint of obtaining high-definition and high-resolution images. The weight-average particle diameter of the toner can be measured by pore electrical resistance. For instance, the measurement can be carried out using a "Coulter Counter Multisizer 3" (by Beckman Coulter, Inc.). The toner particle dispersion thus obtained is fed to a filtration step for solid-liquid separation of the toner particle and the aqueous medium.

Solid-liquid separation for obtaining a toner particle from the obtained toner particle dispersion can be carried out in accordance with a general filtration method. It is preferable to perform thereafter further washing for instance by washing using a re-slurry or washing water, in order to remove foreign matter not having been removed from the toner particle surface. After sufficient washing solid-liquid separation is performed again, to yield a toner cake. A toner particle is obtained thereafter through drying using a known drying unit, and by classifying, as needed, to separate particle groups having a particle diameter other than a predetermined one. Herein the separated particle groups having a particle diameter other than a predetermined one may be reused for the purpose of improving the final yield.

In a case where a surface layer having an organosilicon polymer is to be formed, and the toner particle is formed in an aqueous medium, the surface layer can be formed through addition of a hydrolysis solution of an organosilicon compound, as described above, while performing for instance a polymerization step in the aqueous medium. The toner particle dispersion after polymerization may be used as a core particle dispersion, and the hydrolysis solution of the organosilicon compound may be then further added, to form the surface layer. In the case of for instance kneading pulverization, not involving an aqueous medium, the obtained toner particle can be used as a core particle dispersion by being dispersed in an aqueous medium, whereupon the hydrolysis solution of the organosilicon compound can be added, as described above, to form the surface layer.

Methods for Measuring the Physical Properties of Toner

Method for Separating a THF-Insoluble Fraction or the Toner Particle for NMR Measurement An insoluble fraction of the toner particle in tetrahydrofuran (THF) can be obtained as follows. Herein 10.0 g of toner particle are weighed, are laid on cylindrical filter paper (No. 86R by Toyo Roshi Kaisha Ltd.), and are set in a Soxhlet extractor). Extraction is performed for 20 hours using 200 mL of THF as a solvent, and the filtrate on the cylindrical filter paper is vacuum-dried at 40° C. for several hours, to yield a THF-insoluble fraction of the toner particle for NMR measurement.

In a case where the surface of the toner particle is treated using for instance an external additive, the toner particle can be obtained by removing the external additive in accordance with the following method. Herein 160 g of sucrose (by Kishida Chemical Co. Ltd.) are added to 100 mL of ion-exchanged water and dissolved therein while being warmed in a hot water bath, to prepare a sucrose concentrate. Then 31 g of this sucrose concentrate and 6 mL of Contaminon N (10 mass % aqueous solution of a pH-7 neutral detergent for precision measuring instruments, made up of a nonionic surfactant, an anionic surfactant and an organic builder, by Wako Pure Chemical Industries, Ltd.) are introduced into a centrifuge tube (50 mL volume). A dispersion is produced as a result. Then 1.0 g of toner is added to this dispersion, and toner clumps are broken up using a spatula or the like.

The centrifuge tube is shaken in a shaker for 20 minutes at 350 spm (strokes per minute). After shaking, the solution is transferred to a glass tube (50 mL volume) for swing rotors, and is centrifuged under conditions of 3500 rpm for 30 minutes, using a centrifuge (H-9R, by Kokusan Co. Ltd.). As a result of this operation the toner particle becomes separated from the detached external additive. Sufficient separation of the toner and the aqueous solution is checked visually, and the toner separated into the uppermost layer is retrieved using a spatula or the like. The retrieved toner is filtered through a vacuum filter and is then dried for 1 hour or longer in a dryer, to yield a toner particle. This operation is carried out a plurality of times, to secure the required amount.

Method for Identifying the Substructure Represented by Formula (1)

The substructure represented by Formula (1) in the organosilicon polymer contained in the toner particle is identified in accordance with the method below.

The hydrocarbon group represented by R in Formula (1) is identified by $^{13}$C-NMR ($^{13}$C-NMR (solid) measurement conditions).

Apparatus: JNM-ECX500II by JEOL RESONANCE Co. Ltd.

Sample tube: 3.2 mmϕ

Sample: 150 mg of tetrahydrofuran-insoluble fraction for toner particle for NMR measurement Measurement temperature: room temperature Pulse mode: CP/MAS Measured nucleus frequency: 123.25 MHz($^{13}$C)

Reference substance: adamantane (external standard: 29.5 ppm)

Sample rotation: 20 kHz

Contact time: 2 ms

Delay time: 2 s

Cumulative count: 1024 scans

In the above method, the hydrocarbon group represented by R in Formula (1) is ascertained on the basis of the presence or absence of a signal derived for instance from a methyl group (Si—$CH_3$), an ethyl group (Si—$C_2H_5$), a propyl group (Si—$C_3H_7$), a butyl group (Si—$C_4H_9$), a pentyl group (Si—$O_5H_{11}$), a hexyl group (Si—$C_6H_{13}$) or a phenyl group (Si—$C_6H_5$) bonded to a silicon atom.

Method for Calculating the Proportion of Peak Areas Attributable to the Structure of Formula (1) in the Organosilicon Polymer Contained in the Toner Particle The $^{29}$Si-NMR (solid) of the THF-insoluble fraction of the toner particle is measured under the following measurement conditions ($^{29}$Si-NMR (solid) measurement conditions).

Apparatus: JNM-ECX500II by JEOL RESONANCE Co. Ltd.
Sample tube: 3.2 mmϕ
Sample: 150 mg of tetrahydrofuran-insoluble fraction for toner particle for NMR measurement
Measurement temperature: room temperature
Pulse mode: CP/MAS
Measured nucleus frequency: 97.38 MHz($^{29}$Si)
Reference substance: DSS (external standard: 1.534 ppm)
Sample rotation: 10 kHz
Contact time: 10 ms
Delay time: 2 s
Cumulative count: 2000 to 8000 scans After the measurement, a plurality of silane components having different substituents and different bonded groups in the tetrahydrofuran-insoluble fraction of the toner particle are subjected to peak separation, by curve fitting, into an X1 structure, an X2 structure, an X3 structure and an X4 structure given below, and the respective peak areas are calculated.

X1 structure: $(Ri)(Rj)(Rk)SiO_{1/2}$ Formula (2)

X2 structure: $(Rg)(Rh)Si(O_{1/2})_2$ Formula (3)

X3 structure: $RmSi(O_{1/2})_3$ Formula (4)

X4 structure: $Si(O_{1/2})_4$ Formula (5)

[C2]

(2)

X1 structure: 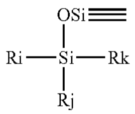

(3)

X2 structure: 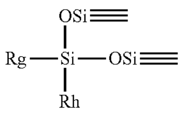

(4)

X3 structure: 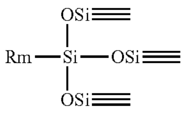

(5)

X4 structure: 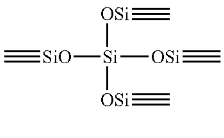

(In Formulae (2), (3) and (4), the groups Ri, Rj, Rk, Rg, Rh and Rm each represent an organic group such as a C1 to C6 hydrocarbon group, a halogen atom, a hydroxy group or an alkoxy group bonded to a silicon atom.)

In the present invention, preferably, the proportion of the peak area attributable to the structure of Formula (1) relative to the total peak area of the organosilicon polymer, in a chart obtained through $^{29}$Si-NMR measurement of the THF-insoluble fraction of the toner particle, is 20% or higher. In a case where the substructure represented by Formula (1) is to be ascertained in further detail, the structure may be identified on the basis of measurement results by 1H-NMR, along with the above measurement results by $^{13}$C-NMR and $^{29}$Si-NMR.

Method for Measuring the Proportion of Surface Layer Thickness of 2.5 Nm or Less and Containing an Organosilicon Polymer, Measured by Cross-Sectional Observation of a Toner Particle Using a Transmission Electron Microscope (TEM)

In the present invention a cross-sectional observation of the toner particle is accomplished in accordance with the method below. As a concrete method for observing the cross section of the toner particle, the toner particle is thoroughly dispersed in a room temperature-curable epoxy resin and is then cured in an air atmosphere at 40° C. for 2 days. A flaky sample is cut out from the obtained cured product using a microtome equipped with a diamond blade. The sample is magnified using a transmission electron microscope (JEM-2800 by JEOL) (TEM) at from 10000 to 100000 magnifications, and the cross section of the toner particle is observed.

Confirmation can be performed relying on the difference in the atomic weights between the binder resin and surface layer material, and by virtue of the fact that contrast is clear for large atomic weights. Ruthenium tetroxide staining and osmium tetroxide staining are resorted to in order to impart contrast between the materials.

A circle-equivalent diameter Dtem is determined for the toner particle cross section obtained from the TEM micrograph; the particles used for the measurement are those particles for which this value falls within a window of ±10% of a weight-average toner particle diameter D4 as determined in accordance with the method described above.

A dark field image of the toner particle cross section is acquired at an acceleration voltage of 200 kV, using JEM-2800 from JEOL, as indicated above. Next, a mapping image is acquired, using a GIF Quantum EELS detector by Gatan, Inc., in accordance with the three-window method, and the surface layer is identified.

For an individual toner particle having a circle-equivalent diameter Dtem within a window of ±10% of the weight-average toner particle diameter D4, the toner particle cross section is evenly divided into sixteen divisions, taking, as the center, the intersection between a long axis L of the toner particle cross section and an axis L90 that is perpendicular to the long axis L and runs through the center of the long axis L. The dividing axes that run from this center to the surface layer of the toner particle are labeled An (n=1 to 32) respectively, where RAn denotes the length of the dividing axis and FRAn denotes the thickness of the surface layer.

A proportion is worked out then of the number of dividing axes for which the thickness of the surface layer containing the organosilicon polymer, on the 32 dividing axes, is 2.5 nm or less. For averaging, measurements are carried out on 10 toner particles and an average value per toner particle is calculated.

Circle-Equivalent Diameter (Dtem) Determined from Toner Particle Cross Sections Obtained from Transmission Electron Microscope (TEM) Micrographs The circle-equivalent diameter (Dtem) obtained from a cross section obtained on the basis of a TEM micrograph is determined in accordance with the following method. Firstly the circle-equivalent diameter Dtem worked out from the cross section of a toner particle obtained on the basis of a TEM micrograph is determined, in accordance with the expression below, for one toner particle.

[Circle-equivalent diameter (Dtem) determined from toner particle cross section obtained from TEM micrograph] =(RA1+RA2+RA3+RA4+RA5+RA6+RA7+RA8+RA9+RA10+RA11+RA12+RA13+RA14+RA15+RA16+RA17+RA18+RA19+RA20+RA21+RA22+RA23+RA24+RA25+RA26+RA27+RA28+RA29+RA30+RA31+RA32)/16

The circle-equivalent diameter is worked out for 10 toner particles, and the average value per particle is calculated and used as the circle-equivalent diameter (Dtem) determined from the toner particle cross section.

Proportion of Thickness of 2.5 nm or Less in the Surface Layer Containing the Organo Silicon Polymer

[Proportion of thickness (FRAn) of 2.5 nm or less in the surface layer containing the organosilicon polymer]=[{number of dividing axes for which the thickness (FRAn) of the surface layer containing the organosilicon polymer is 2.5 nm or less}/32]×100

This calculation is performed for 10 toner particles, to work out the average value of the resulting 10 values of the proportion of surface layer of thickness (FRAn) being 2.5 nm or less, this proportion is taken herein as the proportion of surface layer of thickness (FRAn) of the toner particle being 2.5 nm or less.

Measurement of the Content of Organosilicon Polymer in the Toner Particle

The content of the organosilicon polymer is measured using an "Axios" wavelength-dispersive X-ray fluorescence analyzer (by Malvern Panalytical B.V.) and the software "SuperQ ver. 4.0F" (by Malvern Panalytical B.V.), ancillary to the instrument, for setting measurement conditions and analyzing measurement data. Rhodium (Rh) is used as the anode of the X-ray tube, the measurement atmosphere is vacuum, the measurement diameter (collimator mask diameter) is set to 27 mm, and the measurement time is set to 10 seconds. Detection is carried out using a proportional counter (PC) to measure light elements, and using a scintillation counter (SC) to measure heavy elements.

Herein 4 g of the toner particle are introduced into a dedicated aluminum ring for pressing and are smoothed over; then a pellet shaped to a thickness of 2 mm and a diameter of 39 mm is obtained using a "BRE-32" tablet compression molder (by Maekawa Testing Machine Mfg. Co. Ltd.), through compression for 60 seconds at 20 MPa, the resulting pellet being used as the measurement sample.

Further, 0.5 parts by mass of a silica ($SiO_2$) fine powder are added to 100 parts by mass of the toner particle not containing the organosilicon polymer, with thorough mixing using a coffee mill. Similarly, 5.0 parts by mass and 10.0 parts by mass of a silica fine powder are mixed with 100 parts by mass of the toner particle, and the respective resulting mixtures are used as samples for a calibration curve.

For each of these samples there is produced a pellet of the sample for a calibration curve, in the manner described above, using a tablet compression molder, and a count rate (units: cps) is measured for Si-Kα radiation observed at a diffraction angle (2θ) of 109.08°, using PET as the analyzer crystal. The acceleration voltage and current value in the X-ray generator are set to 24 kV and 100 mA, respectively. A respective calibration curve in the form of a linear function is obtained by plotting the obtained X-ray count rate on the vertical axis and the addition amount of $SiO_2$ in each calibration curve sample on the horizontal axis. The toner particle to be analyzed is then made into a pellet in the above-described manner, using the tablet compression molder, and is measured for the Si-Kα radiation count rate. The content of the organosilicon polymer in the toner particle is determined from the above calibration curve.

Method for Measuring the Fixing Ratio of the Organosilicon Polymer

Herein 160 g of sucrose (by Kishida Chemical Co. Ltd.) are added to 100 mL of ion-exchanged water and dissolved while warmed in a hot water bath, to prepare a sucrose concentrate. Then 31 g of this sucrose concentrate and 6 mL of Contaminon N (10 mass % aqueous solution of a pH-7 neutral detergent for precision measuring instruments, made up of a nonionic surfactant, an anionic surfactant and an organic builder, by Wako Pure Chemical Industries, Ltd.) are introduced into a centrifuge tube (50 mL volume). A dispersion is produced as a result. Then 1.0 g of toner is added to this dispersion, and toner clumps are broken up using a spatula or the like.

The centrifuge tube is shaken in a shaker for 20 minutes at 350 spm (strokes per minute). After shaking, the solution is transferred to a glass tube (50 mL volume) for swing rotors, and is centrifuged under conditions of 3500 rpm for 30 minutes, using a centrifuge (H-9R, by Kokusan Co. Ltd.). Sufficient separation of the toner and the aqueous solution is checked visually, and the toner separated into the uppermost layer is retrieved using a spatula or the like. The aqueous solution containing the retrieved toner is filtered through a vacuum filter and is then dried for 1 hour or longer in a dryer. The dried product is crushed with a spatula, and the amount of silicon is measured by X-ray fluorescence. The fixing ratio (%) is calculated from the ratio for the amount of the element to be measured between the toner after water washing and the starting toner.

The X-ray fluorescence of a particular element is measured according to JIS K 0119-1969, specifically as follows. The measuring device used herein is an "Axios" wavelength-dispersive X-ray fluorescence analyzer (by Malvern Panalytical B.V.), and the software "SuperQ ver. 4.0F" (by Malvern Panalytical B.V.) ancillary to the instrument for setting measurement conditions and analyzing measurement data. Rhodium (Rh) is used as the anode of the X-ray tube, the measurement atmosphere is vacuum, the measurement diameter (collimator mask diameter) is set to 10 mm, and the measurement time is set to 10 seconds. Detection is carried out using a proportional counter (PC) to measure light elements, and using a scintillation counter (SC) to measure heavy elements.

About 1 g of the water-washed toner or of starting toner is introduced into a dedicated aluminum ring having a diameter of 10 mm for pressing and is smoothed over; then a pellet shaped to a thickness of 2 mm is obtained by compression by a tablet compression molder for 60 seconds at 20 MPa, with the pellet being used as a respective measurement sample. The tablet compression molder used herein is "BRE-32" (by Maekawa Testing Machine Mfg. Co. Ltd.).

The measurement is carried out under the above conditions, whereupon elements are identified on the basis of the obtained X-ray peak positions; element concentrations are calculated from a count rate (units: cps), as the number of X-ray photons per unit time. As a quantitative method for the toner, for instance in terms of the amount of silicon in the toner, 0.5 parts by mass of a silica ($SiO_2$) fine powder are added to 100 parts by mass of the toner particle, with thorough mixing using a coffee mill. Similarly, 2.0 parts by mass and 5.0 parts by mass of the silica fine powder are each mixed with 100 parts by mass of the toner particle, and the respective mixtures are used as samples for a calibration curve.

For each of these samples there is produced a pellet of the sample for a calibration curve, in the manner described above, using a tablet compression molder, and a count rate (units: cps) is measured for the Si-Kα radiation observed at a diffraction angle (2θ) of 109.08°, using PET as an analyzer crystal. The acceleration voltage and current value in the X-ray generator are set to 24 kV and 100 mA, respectively. A calibration curve in the form of a linear function is obtained by plotting the obtained X-ray count rate on the vertical axis and the addition amount of $SiO_2$ in each calibration curve sample on the horizontal axis. The toner to be analyzed is then made into a pellet in the above-described manner, using a tablet compression molder, and is measured for Si-Kα radiation count rate. The content of the organosilicon polymer in the toner is determined from the above calibration curve. The fixing ratio (%) is worked out in the form of the ratio for the amount of the element in the water-washed toner relative to amount of element in the starting toner, calculated in accordance with the above method.

The present invention will be specifically explained hereafter by means of examples, but the invention is not meant to be limited to or by these examples. Unless particularly noted otherwise, the languages "parts" and "%" pertaining to the materials in the examples and comparative examples refer to mass basis in all instances.

Detailed Example 1

Preparation Step of Aqueous Medium 1

Herein 14.0 parts of sodium phosphate (dodecahydrate) (by RASA Industries, Ltd.) were charged into 1000.0 parts of ion-exchanged water in a reaction vessel, and the temperature was maintained for 1.0 hour at 65° C., while under purging with nitrogen.

An aqueous calcium chloride solution of 9.2 parts of calcium chloride (dihydrate) dissolved in 10.0 parts of ion-exchanged water was added all at once, while under stirring at 12000 rpm, using a T.K. Homomixer (by Tokushu Kika Kogyo Co., Ltd.), to prepare an aqueous medium containing a dispersion stabilizer. Then 10 mass % hydrochloric acid was charged into the aqueous medium, to adjust pH to 5.0, and yield thereby Aqueous medium 1.

Step of Hydrolyzing an Organosilicon Compound for Surface Layer

Herein 60.0 parts of ion-exchanged water were weighed in a reaction vessel equipped with a stirrer and thermometer, and pH was adjusted to 3.0 using 10 mass % hydrochloric acid. The temperature was brought to 70° C. by heating while under stirring. This was followed by addition of 40.0 parts of methyltriethoxysilane as the organosilicon compound for surface layer, and stirring for 2 hours or longer, to conduct hydrolysis. The end point of hydrolysis was confirmed visually at the point in time where oil-water separation ceased and a single layer formed; a hydrolysis solution of an organosilicon compound for surface layer was then obtained through cooling.

Step of Preparing a Polymerizable Monomer Composition

Styrene: 50.0 parts

Carbon black (NIPex 35 (by Orion Engineered Carbons GmbH): 7.0 parts

The above materials were charged into an attritor (by Mitsui Miike Chemical Engineering Machinery Co., Ltd.), with dispersion for 5.0 hours at 220 rpm, using zirconia particles having a diameter of 1.7 mm, to prepare a pigment dispersion. The following materials were added to this pigment dispersion.

Styrene: 20.0 parts n-butyl acrylate: 30.0 parts

Crosslinking agent (divinylbenzene): 0.3 parts

Saturated polyester resin: 5.0 parts (polycondensate (molar ratio 10:12) of propylene oxide-modified bisphenol A (2 mol adduct) and terephthalic acid, glass transition temperature Tg=68° C., weight-average molecular weight Mw=10000, molecular weight distribution Mw/Mn=5.12)

Fischer-Tropsch wax (melting point 78° C.): 7.0 parts

The resulting product was held at 65° C., with dissolution and dispersion to homogeneity at 500 rpm, using a T.K. Homomixer (by Tokushu Kika Kogyo Co., Ltd.), to prepare a polymerizable monomer composition.

Granulating Step

While holding the temperature of Aqueous medium 1 at 70° C. and holding the rotational speed of the T.K. Homomixer at 12000 rpm, the polymerizable monomer composition was charged into Aqueous medium 1, and 9.0 parts of the polymerization initiator t-butyl peroxypivalate were added. The whole was granulated, as it was, for 10 minutes in the stirring device while maintaining 12000 rpm.

Polymerization Step

After the granulation step, the stirrer was replaced by a propeller stirring blade, and polymerization was conducted for 5.0 hours with the temperature held at 70° C. and while under stirring at 150 rpm. The polymerization reaction was then conducted by raising the temperature to 85° C. and by heating for 2.0 hours, to yield core particles. The slurry containing the core particles was cooled down to a temperature of 55° C.; a measurement of pH yielded then a value of 5.0. Then 20.0 parts of the hydrolysis solution of the organosilicon compound for surface layer were added, while under continued stirring at 55° C., to initiate formation of the surface layer on the toner. After holding the slurry like this for 30 minutes, the pH of the slurry was adjusted to 9.0 using an aqueous solution of sodium hydroxide, to complete condensation; this was followed by further 300 minutes of holding, to form the surface layer.

Washing and Drying Step

Once the polymerization step was over, the obtained toner particle slurry was cooled, hydrochloric acid was added to the toner particle slurry to adjust the pH to 1.5 or below, and the slurry was allowed to stand for 1 hour while under stirring; solid-liquid separation was thereafter performed using a pressure filter, to yield a toner cake. The toner cake was re-slurried with ion-exchanged water to yield a dispersion once more, after which solid-liquid separation was performed using the above-described filter. Re-slurrying and solid-liquid separation were repeated until the electrical conductivity of the filtrate reached 5.0 μS/cm or less, after which a toner cake was ultimately obtained in a final solid-liquid separation.

The obtained toner cake was dried using a Flash Jet Dryer airflow dryer (by Seishin Enterprise Co., Ltd.), and fine/coarse powders were cut using a multi-grade classifier relying on the Coanda effect, to yield Toner particle 1. The drying conditions involved a blow-in temperature of 90° C. and a dryer outlet temperature of 40° C.; further, the feed rate of toner cake was adjusted in accordance with the moisture content of the toner cake, to a rate at which the outlet temperature did not deviate from 40° C.

Silicon mapping was performed in a TEM observation of the cross section of Toner particle 1 to ascertain the presence of silicon atoms on the surface layer, and to ascertain that the proportion of the number of dividing axes for which the thickness of the surface layer of the toner particle containing the organosilicon polymer is 2.5 nm or less, is not higher than 20.0%. Also in the examples that follow the presence of silicon atoms in the surface layer containing the organosilicon polymer, and whether the proportion of the number of dividing axes for which the thickness of the surface layer is 2.5 nm or less, was not higher than 20.0% were likewise ascertained by resorting to similar silicon mapping. In the present example the obtained Toner particle 1 was used as it was, without external addition, as Toner 1.

The methods resorted to in the various evaluations performed on Toner 1 are described below.

Measurement of Martens Hardness

Martens hardness was measured in accordance with the above-described method.

Method for Measuring the Fixing Ratio

The fixing ratio was measured in accordance with the above-described method.

Print Out Evaluation

A modified commercially available laser printer LBP7600C by Canon Inc. was used herein. The modification involved altering the main body of the evaluation machine and the software thereof, to thereby set the rotational speed of the developing roller 31 so that the developing roller 31 rotated at a peripheral speed that was 1.8 times higher. Specifically, the rotational speed of the developing roller 31 prior to modification corresponded to a peripheral speed of 200 mm/sec, and of 360 mm/sec after modification.

Herein 40 g of the toner were filled into a toner cartridge of LBP7600C. This toner cartridge was held for 24 hours in a normal-temperature, normal-humidity environment NN (25° C./50% RH). After being allowed to stand for 24 hours in this environment the toner cartridge was fitted the LBP7600C.

Evaluations of rise-up of charging, developing roller Si amount, transferability and re-transferability were performed after print-out of 4000 prints of an image having a print percentage of 1.0%, in the width direction of A4 paper, in a NN environment. An initial evaluation of rise-up of charging was also performed.

Once a series of evaluations were complete, 40 g of toner having been allowed to stand for 24 hours in an environment of normal temperature and normal humidity NN (25° C./50% RH) were replenished into the toner cartridge, which was then fitted to the modified LBP7600C. A post-replenishment evaluation was then performed in the NN environment. The evaluation items included rise-up of charging, transferability and re-transferability.

Evaluation of Development Streaks

A halftone image (toner laid-on level: 0.2 $mg/cm^2$) was printed out on letter-size Xerox Vitality Multipurpose Printer Paper (by Xerox Corporation, 75 $g/m^2$), and development streaks were evaluated. The evaluation criteria were set as follows, with C or better being regarded as good.

Evaluation Criteria

A: vertical streaks in the paper ejection direction are not observable on the developing roller 31 or on the image.

B: 5 or fewer observable thin streaks in the circumferential direction at both ends of the developing roller 31; alternatively, a hint of vertical streaks in the paper ejection direction observable on the image.

C: at least 6 and not more than 20 thin streaks observable in the circumferential direction, at both ends of the developing roller 31; alternatively, 5 or fewer thin streaks observable on the image.

D: 21 or more streaks observable on the developing roller 31; alternatively, 1 or more conspicuous streaks or 6 or more thin streaks observable on the image.

Ghosting Evaluation

An image constructed through repetition of a solid-image vertical line and a solid white vertical line, having a width of 3 cm, was continuously outputted over 10 prints; one print of a halftone image was then outputted, and the pre-image history remaining on the image was visually assessed. The image density of the halftone image was adjusted so that a reflection density measurement performed using a MacBeth densitometer (by MacBeth Corporation) with an SPI filter yielded a reflection density of 0.4. Evaluation criteria were as follows.

Evaluation Criteria

A: no ghosting.

B: slight pre-image history visually observable in some areas.

C: pre-image history visually observable in some areas.

D: pre-image history visually observable all over.

Evaluation of Cleaning Performance

Five prints of a halftone image having a toner laid-on level of 0.2 $mg/cm^2$ were outputted and evaluated. The evaluation criteria were as follows.

Evaluation Criteria

A: no images with faulty cleaning; no dirt on charging roller 2.

B: no images with faulty cleaning; dirt on charging roller 2.

C: slight faulty cleaning observable on the halftone image.

D: Conspicuous faulty cleaning on the halftone image.

Evaluation of Rise-Up of Charging

Figure 6:
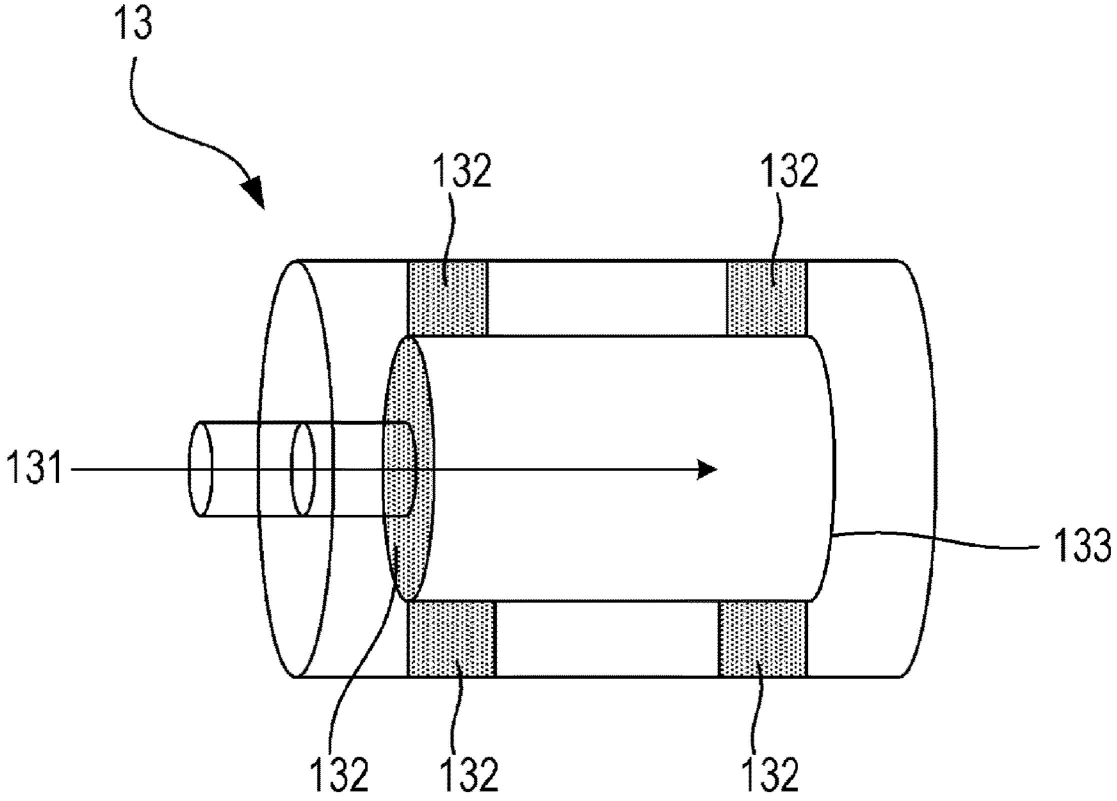
FIG. 6 is a schematic diagram of the structure of a Faraday cage in Embodiment 1.

Herein 10 prints of a solid image are outputted. The machine is forcibly halted during output of the 10th print, and the amount of toner charge on the developing roller 31 immediately after passage past the developing blade 34 is measured. The amount of charge on the developing roller 31 was measured using the Faraday cage 13 illustrated in the in the perspective diagram in FIG. 6. The toner on the developing roller 31 was suctioned in through lowering of the pressure in the interior (right side in the figure), and the toner was captured by providing a toner filter 133. The reference symbol 131 denotes a suction zone, and the reference symbol 132 denotes a holder. The amount of charge per unit mass Q/M (μC/g) was calculated, with M as the mass of captured toner, and Q as the charge directly measured using a coulombmeter, and was taken as amount of toner charge (Q/M), which was then rated as follows.

A: less than −40 μC/g

B: at least −40 μC/g and less than −30 μC/g

C: at least −30 μC/g and less than −20 μC/g

D: −20 μC/g or more

Detailed Example 2 to Example 12

Toners were produced in the same way as in Example 1 but herein the conditions under which the hydrolysis solution was added in the "polymerization step", and the holding time after the addition of the hydrolysis solution were modified as given in Table 5. The pH of each slurry was adjusted with hydrochloric acid and an aqueous solution of sodium hydroxide. The obtained toners were evaluated in the same way as in Example 1. Evaluation results are given in Table 6.

Detailed Example 13 to Example 18

Toners were produced in accordance with the same method as in Example 1 but herein the organosilicon compound for surface layer used in the "Step of hydrolyzing an organosilicon compound for surface layer" was modified as given in Table 5. The obtained toners were evaluated in the same way as in Example 1. Evaluation results are given in Table 6.

Detailed Example 19 to Example 23

Toners were produced in accordance with the same method as in Example 1 but herein the conditions of addition of the hydrolysis solution in the "Polymerization step" were modified as given in Table 5. The obtained toners were evaluated in the same way as in Example 1. Evaluation results are given in Table 6.

Comparative Example 1 and Comparative Example 2

Toners were produced in the same way as in Example 1 but herein the conditions under which the hydrolysis solution was added in the "Polymerization step", and the holding time after addition of the hydrolysis solution, were modified as given in Table 5. The obtained toners were evaluated in the same way as in Example 1. Evaluation results are given in Table 6.

Comparative Example 3

The "step of hydrolyzing the organosilicon compound for surface layer" was not carried out. Instead, 8 parts of methyltriethoxysilane as the organosilicon compound for surface layer were added, in the form of the monomer as it was, in the "Step of preparing a polymerizable monomer composition".

No hydrolysis solution was added herein after cooling down to 70° C. and pH measurement in the "Polymerization step". While under continued stirring at 70° C., the pH of the slurry was adjusted to 9.0, using an aqueous solution of sodium hydroxide, to complete condensation; this was followed by further 300 minutes of holding, to form a surface layer. Otherwise, a toner was produced in the same way as in Example 1. The obtained toner was evaluated in the same way as in Example 1. Evaluation results are given in Table 6.

Comparative Example 4

The amount of methyltriethoxysilane added in the "Step of preparing a polymerizable monomer composition" of Comparative example 3 was modified herein to 15 parts. Otherwise, a toner was produced in the same way as in Comparative example 3. The obtained toner was evaluated in the same way as in Example 1. Evaluation results are given in Table 6.

Comparative Example 5

The amount of methyltriethoxysilane added in the "Step of preparing a polymerizable monomer composition" of Comparative example 3 was modified herein to 30 parts. Otherwise, a toner was produced in the same way as in Comparative example 3. The obtained toner was evaluated in the same way as in Example 1. Evaluation results are given in Table 6.

Comparative Example 6

Production Example of Binder Resin 1

| | |
|---|---|
| Terephthalic acid | 25.0 mol % |
| Adipic acid | 13.0 mol % |
| Trimellitic acid | 8.0 mol % |
| Propylene oxide-modified bisphenol A (2.5 mol adduct) | 33.0 mol % |
| Ethylene oxide-modified bisphenol A (2.5 mol adduct) | 21.0 mol % |

A total of 100 parts of the acid components and alcohol components given above and 0.02 parts of tin 2-ethylhexanoate as an esterification catalyst were introduced into a four-necked flask. A pressure reduction device, a water separation device, a nitrogen gas introduction device, a temperature measurement device and a stirrer were fitted, and the reaction was conducted by raising the temperature to 230° C. in a nitrogen atmosphere. Once the reaction was over, the resulting product was removed from the flask and was cooled and pulverized, to yield Binder resin 1.

Production Example of Binder Resin 2

Binder resin 2 was produced in accordance with the same method as in Binder resin 1, but modifying herein the monomer composition ratio and the reaction temperature as follows.

| | |
|---|---|
| Terephthalic acid | 50.0 mol % |
| Trimellitic acid | 3.0 mol % |
| Propylene oxide-modified bisphenol A (2.5 mol adduct) | 47.0 mol % |
| Reaction temperature | 190° C. |

Production Example of Comparative Toner 6

Binder resin 1: 70.0 parts

Binder resin 2: 30.0 parts

Magnetic iron oxide particle: 90.0 parts (number-average particle diameter 0.14 μm, Hc=11.5 kA/m, σs=84.0 $Am^2/kg$, σr=16.0 $Am^2/kg$)

Fischer-Tropsch wax (melting point 105° C.): 2.0 parts

Charge control agent 1 (structural formula below): 2.0 parts

Charge Control Agent 1

[C3]

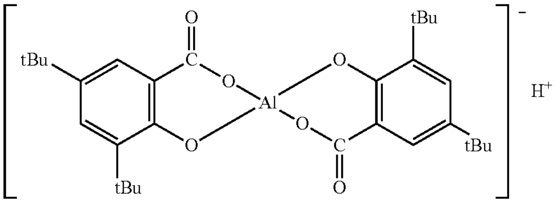

In the formula tBu represents a tertbutyl group.

The above materials were pre-mixed in a Henschel mixer and were then melt-kneaded using a twin-screw kneader-extruder having three kneading sections and a screw section.

Melt-kneading was carried out at 110° C. as the heating temperature of the first kneading section, and closest to the feeding port, 130° C. as the heating temperature of the second kneading section, at 150° C. as the heating temperature of the third kneading section, and at 200 rpm as the paddle rotational speed, to yield a kneaded product that was then cooled. The product was coarsely pulverized with a hammer mill, and was subsequently pulverized with a pulverizer using a jet stream, the resulting finely pulverized powder being classified using a multi-grade classifier relying on the Coanda effect, to yield a toner particle having a weight-average particle diameter of 7.0 μm.

Then 1.0 part of a hydrophobic silica fine powder (BET 140 $m^2/g$, silane coupling-treated and silicone oil-treated, hydrophobicity 78%) and 3.0 parts of strontium titanate (D50 of 1.2 μm) were mixed through external addition, with 100 parts of the toner particle. This was followed by screening on a mesh having mesh openings of 150 μm, to yield Comparative toner 6. The same evaluations as in Example 1 were performed on the obtained toner. Evaluation results are given in Table 6.

Comparative Example 7

Magnetic toner particle 1 described in the examples of Japanese Patent Application Publication No. 2015-45860 was produced. A magnetic body in the binder is present in the form of a filler, and has a thermally treated surface. The same evaluations as in Example 1 were performed on the obtained toner. Evaluation results are given in Table 6.

TABLE 5

| | Addition parts of polymerization initiator | Addition parts of crosslinking agent | Type of organosilicon compound for surface layer | Conditions at the time of addition of hydrolysis solution 1 | | | Conditions after addition of hydrolysis solution 1 Holding time (min) until adjustment of pH for condensation completion |
|---|---|---|---|---|---|---|---|
| | | | | Slurry pH | Slurry temperature (° C.) | Addition parts of hydrolysis solution 1 | |
| Example 1 | 9.0 | 0.3 | Methyltriethoxysilane | 5.0 | 55 | 20 | 30 |
| Example 2 | 9.0 | 0.3 | Methyltriethoxysilane | 9.0 | 70 | 20 | 0 |
| Example 3 | 9.0 | 0.3 | Methyltriethoxysilane | 7.0 | 65 | 20 | 3 |
| Example 4 | 9.0 | 0.3 | Methyltriethoxysilane | 5.0 | 5 | 20 | 10 |
| Example 5 | 9.0 | 0.3 | Methyltriethoxysilane | 5.0 | 45 | 20 | 60 |
| Example 6 | 9.0 | 0.3 | Methyltriethoxysilane | 5.0 | 40 | 20 | 90 |
| Example 7 | 11.0 | 0 | Methyltriethoxysilane | 5.0 | 55 | 20 | 30 |
| Example 8 | 9.0 | 0 | Methyltriethoxysilane | 5.0 | 55 | 20 | 30 |
| Example 9 | 9.0 | 0.5 | Methyltriethoxysilane | 5.0 | 55 | 20 | 30 |
| Example 10 | 8.0 | 0.5 | Methyltriethoxysilane | 5.0 | 55 | 20 | 30 |
| Example 11 | 7.0 | 0.6 | Methyltriethoxysilane | 5.0 | 55 | 20 | 30 |
| Example 12 | 7.0 | 0.8 | Methyltriethoxysilane | 5.0 | 55 | 20 | 30 |
| Example 13 | 9.0 | 0.3 | Tetraethoxysilane | 5.0 | 55 | 20 | 30 |
| Example 14 | 9.0 | 0.3 | Dimethyldiethoxysilane | 5.0 | 55 | 20 | 30 |
| Example 15 | 9.0 | 0.3 | Trimethylethoxysilane | 5.0 | 55 | 20 | 30 |
| Example 16 | 9.0 | 0.3 | n-propylethoxysilane | 5.0 | 55 | 20 | 30 |
| Example 17 | 9.0 | 0.3 | Phenyltriethoxysilane | 5.0 | 55 | 20 | 30 |
| Example 18 | 9.0 | 0.3 | Hexyltriethoxysilane | 5.0 | 55 | 20 | 30 |
| Example 19 | 9.0 | 0.3 | Methyltriethoxysilane | 5.0 | 55 | 20 | 0 |
| Example 20 | 9.0 | 0.3 | Methyltriethoxysilane | 5.0 | 55 | 38 | 30 |
| Example 21 | 9.0 | 0.3 | Methyltriethoxysilane | 5.0 | 55 | 75 | 30 |
| Example 22 | 9.0 | 0.3 | Methyltricthoxysilane | 5.0 | 55 | 13 | 30 |
| Example 23 | 9.0 | 0.3 | Methyltriethoxysilane | 5.0 | 55 | 3 | 30 |
| Comparative example 1 | 9.0 | 0.3 | Methyltriethoxysilane | 9.5 | 75 | 20 | 0 |
| Comparative example 2 | 9.0 | 0.3 | Methyltriethoxysilane | 5.0 | 35 | 20 | 150 |
| Comparative example 3 | 9.0 | 0.3 | Methyltriethoxysilane | Added in a dissolution process without performing hydrolysis | | | |
| Comparative example 4 | 9.0 | 0.3 | Methyltriethoxysilane | | | | |
| Comparative example 5 | 9.0 | 0.3 | Methyltriethoxysilane | See text | | | |
| Comparative example 6 | | | | | | | |
| Comparative example 7 | | | | | | | |

TABLE 6

| | Martens hardness (MPa) | | Fixing ratio of organo-silicon polymer (%) | Development streaks | Ghosting | Cleaning performance | Rise-up of charging | | | | Occurrence of talc fogging |
|---|---|---|---|---|---|---|---|---|---|---|---|
| | | | | | | | Initial | | After 4000 prints | | |
| | Maximum load $2.0 \times 10^4$ N | Maximum load $9.8 \times 10^4$ N | | | | | Amount of charge (μC/g) | Rating | Amount of charge (μC/g) | Rating | |
| Example 1 | 598 | 23 | 97 | A | A | A | −35.2 | B | −26.3 | C | No |
| Example 2 | 203 | 12 | 96 | C | C | A | −36.2 | B | −23 | C | No |
| Example 3 | 251 | 16 | 95 | B | B | A | −36.2 | B | −25.3 | C | No |
| Example 4 | 316 | 21 | 96 | A | A | A | −35.6 | B | −25.9 | C | No |
| Example 5 | 980 | 33 | 97 | B | A | A | −35.7 | B | −26.1 | C | No |
| Example 6 | 1092 | 42 | 95 | C | A | A | −35.7 | B | −25.8 | C | No |
| Example 7 | 536 | 3 | 96 | B | A | A | −36.5 | B | −26.1 | C | No |
| Example 8 | 562 | 5 | 95 | B | A | A | −36.6 | B | −26.9 | C | No |
| Example 9 | 606 | 53 | 96 | A | A | A | −35.2 | B | −25.9 | C | No |
| Example 10 | 618 | 78 | 96 | A | A | A | −35.1 | B | −25.4 | C | No |
| Example 11 | 623 | 99 | 95 | A | A | B | −36.2 | B | −26.1 | C | No |
| Example 12 | 633 | 111 | 96 | A | A | C | −35.7 | B | −26.2 | C | No |
| Example 13 | 960 | 33 | 92 | B | A | A | −30.2 | B | −25.1 | C | No |
| Example 14 | 386 | 22 | 93 | A | A | A | −36.2 | B | −25.3 | C | No |
| Example 15 | 301 | 20 | 91 | A | A | A | −37.5 | B | −26.1 | C | No |
| Example 16 | 423 | 22 | 90 | A | A | A | −38.7 | B | −25.6 | C | No |
| Example 17 | 350 | 21 | 92 | A | A | A | −37.4 | B | −26.1 | C | No |
| Example 18 | 328 | 21 | 93 | A | A | A | −36.9 | B | −25.1 | C | No |
| Example 19 | 550 | 23 | 85 | B | B | A | −38.4 | B | −23.1 | C | No |
| Example 20 | 750 | 28 | 92 | A | A | A | −39.2 | B | −26.4 | C | No |
| Example 21 | 950 | 33 | 90 | B | A | A | −39.6 | B | −29 | C | No |
| Example 22 | 430 | 22 | 95 | A | A | A | −34.2 | B | −25.4 | C | No |
| Example 23 | 220 | 12 | 96 | C | C | A | −28.9 | C | −21 | C | No |
| Comparative example 1 | 185 | 10 | 90 | D | D | A | −35.5 | B | −18.5 | D | Yes |
| Comparative example 2 | 1200 | 50 | 91 | D | A | A | −36.2 | B | −15 | D | Yes |
| Comparative example 3 | 89 | 50 | 89 | D | D | A | −36.9 | B | −15.5 | D | Yes |
| Comparative example 4 | 185 | 70 | 88 | D | D | A | −37.1 | B | −18.3 | D | Yes |
| Comparative example 5 | 153 | 150 | 85 | D | D | D | −35.4 | B | −19.2 | D | Yes |
| Comparative example 6 | 43 | 51 | — | D | D | A | −38.2 | B | −18.6 | D | Yes |
| Comparative example 7 | 186 | 50 | — | D | D | A | −37.8 | B | −20.3 | D | Yes |

Effect of the Toner

As the tables reveal, by adjusting the Martens hardness to at least 200 MPa and not more than 1100 MPa, the wear resistance of the toner in the developing portion increases significantly as compared with that of conventional toner, and changes in the amount of charge of the toner, derived from printing, can be curtailed as compared with conventional instances. In addition, talc fogging derived from rubbing between talc and toner could be suppressed, as compared with conventional instances. The tables suggest that the effect of the present invention cannot be satisfactorily achieved in a case where the Martens hardness is lower than 200 MPa.

External Additive

The toner particle can be used as toner, without external addition, but in order to further improve flowability, charging performance, cleaning performance and so forth, for instance a toner may be obtained through further addition of a fluidizing agent, a cleaning aid or the like, as so-called external additives.

Examples of external additives include inorganic oxide fine particles such as silica fine particles, alumina fine particles, and titanium oxide fine particles, and inorganic stearate compound fine particles such as aluminum stearate fine particles and zinc stearate fine particles. Alternative examples include inorganic titanate compound fine particles such as strontium titanate and zinc titanate. These external additives can be used singly or in combinations of two or more types.

The total addition amount of these various types of external additives is preferably at least 0.05 parts by mass and not more than 5 parts by mass, more preferably at least 0.1 parts by mass and not more than 3 parts by mass, relative to 100 parts by mass of the toner particle. Various external additives may be used in combination.

Preferably, the toner has positively charged particles on the surface of the toner particle. Preferably, the number-average particle diameter of the positively charged particles is at least 0.10 μm and not more than 1.00 μm. More preferably, the number-average particle diameter is at least 0.20 μm and not more than 0.80 μm.

It has been found that the presence of such positively charged particles translates into good transfer efficiency throughout durable use. It is deemed that the positively charged particles having the above particle diameter can roll over the toner particle surface, and by being rubbed between the photosensitive drum and the transfer belt, promote negative charging of the toner, thereby suppressing positive charging derived from application of transfer bias. The toner of the present invention is characterized by having a hard surface; positively charged particles are thus not prone to adhere to or be buried in the surface of the toner particle, and high transfer efficiency can be maintained as a result. Preferred types of positively charged particles include for instance hydrotalcite, titanium oxide and melamine resin. Hydrotalcite is particularly preferable among the foregoing.

Preferably, the toner particle has boron nitride on the surface. The means for causing boron nitride to be present on the surface of the toner particle are not particularly limited, but a method in which boron nitride is imparted through external addition is preferred herein. It was found that when the Martens hardness of the toner is in the range according to the present invention, the boron nitride can be made uniformly present on the toner particle surface at a high fixing ratio, while the drop in fixing ratio throughout durable use is moreover small.

Figure 8:
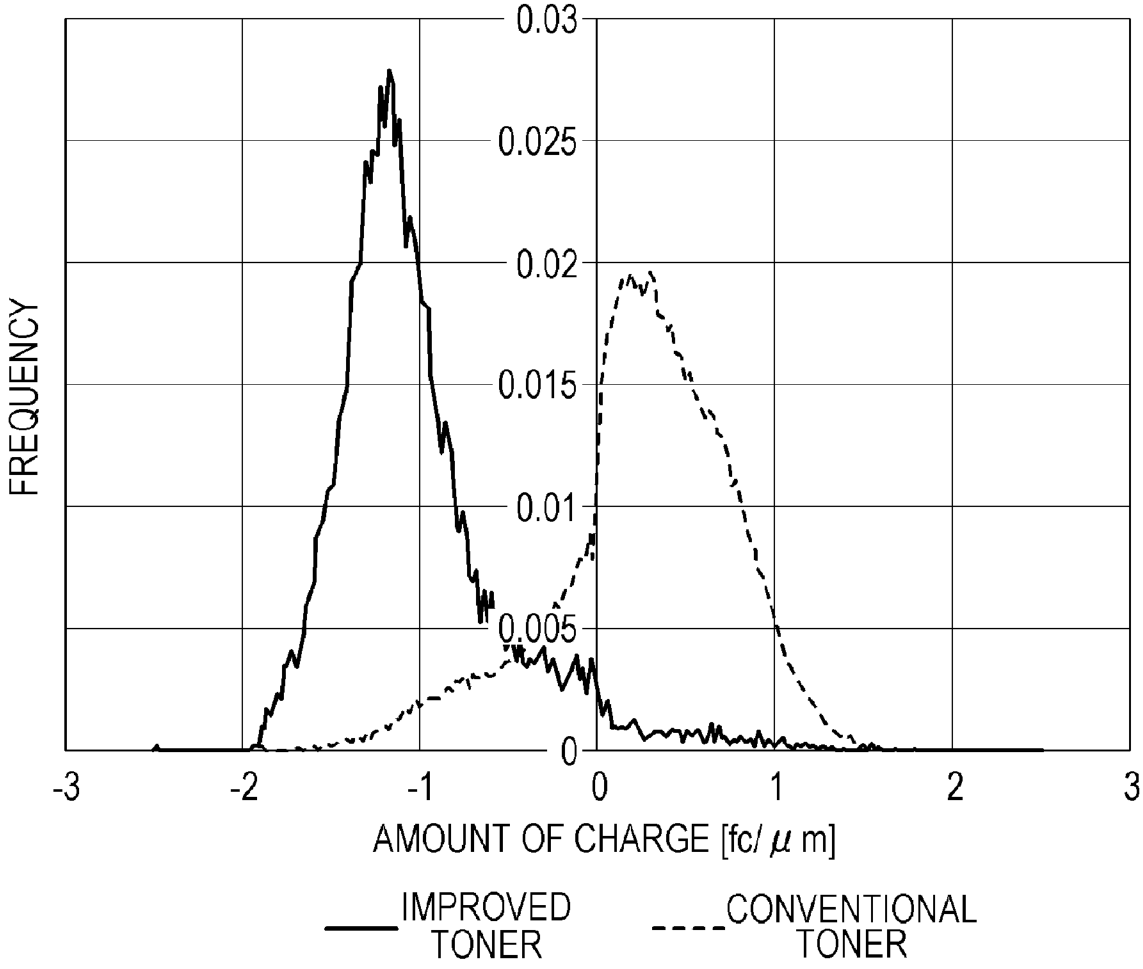
FIG. 8 is a comparison of amount of charge after output of talc paper in Embodiment 1.

By using the toner explained in the present example, the state of the surface does not change readily even when repeatedly acted upon by pressure for instance at the developing portion, and drops in charging performance can be prevented. The charging polarity of the toner remains accordingly negative, which is the regular polarity, even when a transfer material containing talc, which is readily charged to negative polarity, is used as the filler and the talc collected at the developing portion and the toner rub against each other. As a result, the proportion of toner charged to positive polarity, which is a non-regular polarity, can be kept low, and the occurrence of fogging can be accordingly suppressed. FIG. 8 illustrates a graph comparing the distribution of the amount of charge of the toner after output of 4000 prints of a transfer material containing talc as a filler, between an instance where the toner described the present example is utilized and an instance where a conventional toner is used. In this case as well the amount of charge of the toner is measured using E-Spart Analyzer EST-G by Hosokawa Micron Co., Ltd. The toner is measured in a state of being adhered to the developing roller 31.

As FIG. 8 reveals, the charging polarity of the conventional toner skews towards positive polarity, whereas in the improved toner the charging polarity can be maintained negative. In the conventional toner, as a result, positive-polarity toner flies towards the non-image formation portion, giving rise to talc fogging, whereas in the improved toner, by contrast, toner does not fly towards the non-image formation portion, and talc fogging can be prevented.

By using the image forming apparatus explained above a good image can thus be outputted, while unaffected by paper dust and various fillers, also in a cleaner-less configuration.

The present invention allows suppressing image defects by providing a collecting member capable of collecting paper dust/filler having the opposite polarity to that of toner adhered to the photosensitive drum, while curtailing increases in cost and equipment size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-096395, filed on Jun. 2, 2020, which is hereby incorporated by reference herein in its entirety.

What is claimed is:

1. An image forming apparatus, comprising:

an image bearing member;

a charging member that charges the image bearing member;

a first exposure unit that exposes the image bearing member so as to form an electrostatic latent image on the image bearing member;

a developing unit that develops the electrostatic latent image as a developer image by supplying a developer, charged to regular polarity, to the image bearing member;

a transfer member that transfers the developer image from the image bearing member to a recording material;

a brush that forms a brush portion by contacting with the image bearing member downstream of a transfer portion of the image bearing member at which the developer image is transferred to the recording material by the transfer member and upstream of a charging portion of the image bearing member charged by the charging member, in a rotation direction of the image bearing member, and that collects a deposit on the image bearing member and that passes through the developer remaining on the image bearing member without having been transferred to the recording material on the image bearing member; and a second exposure unit that exposes the image bearing member downstream of the brush portion and upstream of the charging portion of the image bearing member charged by the charging member, in the rotation direction of the image bearing member, wherein the developer remaining on the image bearing member without having been transferred to the recording material is collected by the developing unit, wherein the brush has a plurality of bristles, and a base fabric that supports the plurality of bristles, wherein a density of the bristles of the brush is 110 to 290 $kF/inch^2$, and wherein the brush collects the deposit charged to an opposite polarity to the regular polarity.

2. The image forming apparatus according to claim 1, wherein the brush collects the deposit that lies, in the triboelectric series, further on the opposite polarity side to the regular polarity, as compared with a position of the brush in the triboelectric series.

3. The image forming apparatus according to claim 1, wherein the developer has a toner particle that contains a binder resin and a colorant, and wherein Martens hardness measured under a condition of maximum load of $2.0\times10^{-4}$ N is at least 200 MPa and not more than 1100 MPa.

4. The image forming apparatus according to claim 3, wherein the toner particle has a surface layer containing an organosilicon polymer, and a toner core particle covered by the surface layer, and wherein a number of carbon atoms directly bonded to a silicon atom in the organosilicon polymer is, on average, at least 1 and not more than 3 per silicon atom.

5. The image forming apparatus according to claim 4, wherein a fixing ratio of the organosilicon polymer relative to the toner particle is at least 90%.

6. The image forming apparatus according to claim 1, wherein a distance from the brush portion of the image bearing member to an exposure portion of the image bearing member of which the second exposure unit exposes is closer than a distance from the exposure portion of the image bearing member to the charging portion of the image bearing member in the rotation direction of the image bearing member.

7. The image forming apparatus according to claim 1, wherein the charging member comes into contact with the surface of the image bearing member.

8. An image forming apparatus, comprising:

an image bearing member;

a charging member that charges the image bearing member;

a first exposure unit that exposes the image bearing member so as to form an electrostatic latent image on the image bearing member;

a developing unit that develops the electrostatic latent image as a developer image by supplying a developer, charged to regular polarity, to the image bearing member;

a transfer member that transfers the developer image from the image bearing member to a recording material;

a brush that forms a brush portion by contacting with the image bearing member downstream of a transfer portion of the image bearing member at which the developer image is transferred to the recording material by the transfer member and upstream of a charging portion of the image bearing member charged by the charging member, in a rotation direction of the image bearing member, and that collects a deposit on the image bearing member and that passes through the developer remaining on the image bearing member without having been transferred to the recording material on the image bearing member; and a second exposure unit that exposes the image bearing member downstream of the brush portion and upstream of the charging portion of the image bearing member charged by the charging member, in the rotation direction of the image bearing member, wherein the developer remaining on the image bearing member without having been transferred to the recording material is collected by the developing unit, wherein the brush has a plurality of bristles, and a base fabric that supports the plurality of bristles, wherein a density of the bristles of the brush is 110 to 290 $kF/inch^2$, and wherein a distance from the brush portion of the image bearing member to an exposure portion of the image bearing member of which the second exposure unit exposes is closer than a distance from the exposure portion of the image bearing member to the charging portion of the image bearing member in the rotation direction of the image bearing member.

9. An image forming apparatus, comprising:

an image bearing member;

a charging member that charges the image bearing member;

a first exposure unit that exposes the image bearing member so as to form an electrostatic latent image on the image bearing member;

a developing unit that develops the electrostatic latent image as a developer image by supplying a developer, charged to regular polarity, to the image bearing member;

a transfer member that transfers the developer image from the image bearing member to a recording material;

a brush that forms a brush portion by contacting with the image bearing member downstream of a transfer portion of the image bearing member at which the developer image is transferred to the recording material by the transfer member and upstream of a charging portion of the image bearing member charged by the charging member, in a rotation direction of the image bearing member, and that collects a deposit on the image bearing member and that passes through the developer remaining on the image bearing member without having been transferred to the recording material on the image bearing member; and a second exposure unit that exposes the image bearing member downstream of the brush portion and upstream of the charging portion of the image bearing member charged by the charging member, in the rotation direction of the image bearing member, wherein the developer remaining on the image bearing member without having been transferred to the recording material is collected by the developing unit, wherein the brush has a plurality of bristles, and a base fabric that supports the plurality of bristles, wherein a density of the bristles of the brush is 110 to 290 $kF/inch^2$, and wherein the charging member comes into contact with the surface of the image bearing member.

* * * * *